(12) United States Patent
Strobel et al.

(10) Patent No.: US 11,905,677 B2
(45) Date of Patent: Feb. 20, 2024

(54) AIRLOCKS FOR CONVEYING MATERIAL, HYDRO EXCAVATION VACUUM APPARATUS HAVING AIRLOCKS, AND METHODS FOR HYDRO EXCAVATING A SITE

(71) Applicant: Vermeer Manufacturing Company, Pella, IA (US)

(72) Inventors: Andy Strobel, Knoxville, IA (US); Corey Lanoue, Pella, IA (US); Daniel Hofland, Pella, IA (US); Adam Bates, Leighton, IA (US); David Gift, Pella, IA (US); Tayte Askelsen, Pella, IA (US); James W. Skinner, Pella, IA (US); Nathan J. Meyer, Knoxville, IA (US)

(73) Assignee: Vermeer Manufacturing Company, Pella, IA (US)

(*) Notice: Subject to any disclaimer, the term of this patent is extended or adjusted under 35 U.S.C. 154(b) by 666 days.

(21) Appl. No.: 16/740,634

(22) Filed: Jan. 13, 2020

(65) Prior Publication Data
US 2020/0149247 A1 May 14, 2020

Related U.S. Application Data

(63) Continuation of application No. 16/630,057, filed as application No. PCT/US2018/041934 on Jul. 13, 2018.
(Continued)

(51) Int. Cl.
*B04C 5/14* (2006.01)
*E02F 5/22* (2006.01)
(Continued)

(52) U.S. Cl.
CPC .......... *E02F 5/226* (2013.01); *B01D 33/0353* (2013.01); *B01D 33/804* (2013.01);
(Continued)

(58) Field of Classification Search
CPC ....... E02F 5/226; E02F 3/8816; E02F 3/8891; E02F 3/907; E02F 3/925; E02F 3/9262;
(Continued)

(56) References Cited

U.S. PATENT DOCUMENTS 2,156,333 A 5/1939 Cross et al.
2,205,490 A 6/1940 Peterson
(Continued)

FOREIGN PATENT DOCUMENTS

CN 105264167 A * 1/2016 ............ B01D 33/03
CN 105264167 A 1/2016
(Continued)

OTHER PUBLICATIONS

Vigan Airlock, Mobile Machines—Specifications, http://www.vigan.com/en/pneumatique-mobile-airlock.php, available before Jul. 14, 2017.
(Continued)

*Primary Examiner* — Dung H Bui
(74) *Attorney, Agent, or Firm* — Armstrong Teasdale LLP

(57) ABSTRACT

Hydro excavation vacuum apparatus that process spoil material onboard the apparatus by separating water from the cut earthen material are disclosed.

18 Claims, 43 Drawing Sheets

Related U.S. Application Data

(60) Provisional application No. 62/532,853, filed on Jul. 14, 2017.

(51) Int. Cl.

| | | |
|---|---|---|
| *E02F 3/88* | (2006.01) | |
| *E02F 3/92* | (2006.01) | |
| *F04B 23/04* | (2006.01) | |
| *F04B 15/02* | (2006.01) | |
| *B04C 5/28* | (2006.01) | |
| *E02F 7/06* | (2006.01) | |
| *F04B 23/02* | (2006.01) | |
| *B01D 33/03* | (2006.01) | |
| *B01D 33/80* | (2006.01) | |
| *E02F 3/90* | (2006.01) | |
| *B04C 9/00* | (2006.01) | |
| *E02F 3/94* | (2006.01) | |
| *F04B 43/12* | (2006.01) | |
| *F04B 45/08* | (2006.01) | |
| *B07B 1/30* | (2006.01) | |
| *E02F 9/14* | (2006.01) | |
| *B04C 5/26* | (2006.01) | |
| *B01D 45/16* | (2006.01) | |

(52) U.S. Cl.
CPC ........... *B04C 5/14* (2013.01); *B04C 5/28* (2013.01); *B04C 9/00* (2013.01); *E02F 3/8816* (2013.01); *E02F 3/8891* (2013.01); *E02F 3/907* (2013.01); *E02F 3/925* (2013.01); *E02F 3/9262* (2013.01); *E02F 3/9268* (2013.01); *E02F 3/9275* (2013.01); *E02F 3/94* (2013.01); *E02F 7/06* (2013.01); *F04B 15/02* (2013.01); *F04B 15/023* (2013.01); *F04B 23/02* (2013.01); *F04B 23/04* (2013.01); *F04B 43/1253* (2013.01); *B01D 45/16* (2013.01); *B04C 5/26* (2013.01); *B04C 2009/005* (2013.01); *B07B 1/30* (2013.01); *E02F 9/14* (2013.01); *F04B 45/08* (2013.01)

(58) Field of Classification Search
CPC ......... E02F 3/9268; E02F 3/9275; E02F 3/94; E02F 7/06; E02F 9/14; B01D 33/0353; B01D 33/804; B01D 45/16; B04C 5/14; B04C 5/28; B04C 9/00; B04C 5/26; B04C 2009/005; F04B 15/02; F04B 15/023; F04B 23/02; F04B 23/04; F04B 43/1253; F04B 45/08; B07B 1/30
See application file for complete search history.

(56) References Cited

U.S. PATENT DOCUMENTS

| | | | |
|---|---|---|---|
| 2,225,973 A | 12/1940 | Brown et al. | |
| 2,576,283 A | 11/1951 | Chaney | |
| 2,919,898 A | 1/1960 | Marwil et al. | |
| 3,289,775 A | 12/1966 | Stone | |
| 3,766,997 A | 10/1973 | Heilhecker et al. | |
| 3,933,654 A | 1/1976 | Middlebeek | |
| 4,123,365 A | 10/1978 | Middlebeek | |
| 4,428,839 A | 1/1984 | Davies et al. | |
| 4,440,639 A | 4/1984 | Galuska | |
| 4,599,016 A * | 7/1986 | Medemblik | B65G 53/28 55/318 |
| 4,634,535 A | 1/1987 | Lott | |
| 4,882,054 A | 11/1989 | Derrick et al. | |
| 4,948,299 A * | 8/1990 | Cronk, Jr. | E02F 5/14 198/522 |
| 4,996,538 A | 2/1991 | Brecy et al. | |
| 5,066,407 A | 11/1991 | Furlow | |
| 5,295,317 A * | 3/1994 | Perrott | E02F 3/925 37/348 |
| 5,425,188 A * | 6/1995 | Rinker | B01D 46/0002 175/206 |
| 5,487,229 A * | 1/1996 | Nathenson | E02F 3/94 406/171 |
| 5,571,404 A * | 11/1996 | Derenthal | B01D 33/04 210/406 |
| 5,575,085 A | 11/1996 | Groombrige | |
| 5,938,373 A * | 8/1999 | Scudder | E02F 5/226 404/91 |
| 6,080,228 A | 6/2000 | Okada et al. | |
| 6,213,227 B1 | 4/2001 | Dietzen | |
| 6,277,162 B1 | 8/2001 | Hoecker | |
| 6,453,584 B1 | 9/2002 | Buckner | |
| 6,470,605 B1 | 10/2002 | Gilman et al. | |
| 6,517,733 B1 | 2/2003 | Carlson | |
| 6,887,290 B2 | 5/2005 | Strauser et al. | |
| 6,966,466 B2 | 11/2005 | Jensen | |
| 6,988,568 B2 | 1/2006 | Buckner | |
| 7,306,057 B2 | 12/2007 | Strong et al. | |
| 7,337,860 B2 | 3/2008 | McIntyre | |
| 7,503,134 B2 | 3/2009 | Buckner | |
| 7,523,570 B2 * | 4/2009 | Pobihushchy | E02F 3/8816 37/318 |
| 7,604,023 B2 | 10/2009 | Buckner et al. | |
| 7,644,523 B2 | 1/2010 | Buckner | |
| 7,690,445 B2 | 4/2010 | Perez-Cordova | |
| 8,033,299 B2 | 10/2011 | Buckner et al. | |
| 8,172,740 B2 | 5/2012 | El Dorry et al. | |
| 8,302,780 B1 * | 11/2012 | Mitchell | B01D 33/41 210/791 |
| 8,561,803 B2 | 10/2013 | Fallon | |
| 8,613,360 B2 | 12/2013 | Carr | |
| 8,739,354 B2 | 6/2014 | Buckner | |
| 9,073,104 B2 | 7/2015 | Burnett et al. | |
| 9,079,188 B2 | 7/2015 | Culver | |
| 9,181,044 B1 * | 11/2015 | Baker | B65G 51/16 |
| 9,662,599 B2 | 5/2017 | Sewell et al. | |
| 10,207,878 B1 * | 2/2019 | Johnson | B65G 53/66 |
| 10,967,300 B2 | 4/2021 | Droke | |
| 11,111,743 B2 | 9/2021 | Ross et al. | |
| 11,136,840 B2 | 10/2021 | Cates et al. | |
| 2003/0074809 A1 | 4/2003 | Sullivan et al. | |
| 2003/0136747 A1 | 7/2003 | Wood et al. | |
| 2004/0211092 A1 * | 10/2004 | Barnes | E02F 7/02 37/142.5 |
| 2005/0106040 A1 | 5/2005 | Repple et al. | |
| 2005/0115408 A1 * | 6/2005 | Kilgore | B01D 45/12 95/271 |
| 2005/0242003 A1 | 11/2005 | Scott et al. | |
| 2005/0242008 A1 * | 11/2005 | Simpson | B04C 5/04 209/717 |
| 2007/0163927 A1 | 7/2007 | Eia | |
| 2007/0278012 A1 | 12/2007 | Smith | |
| 2008/0040945 A1 | 2/2008 | Buckner | |
| 2008/0078699 A1 | 4/2008 | Carr | |
| 2008/0092411 A1 * | 4/2008 | Guth | E02F 7/06 37/468 |
| 2008/0168753 A1 | 7/2008 | Christiansen | |
| 2009/0120846 A1 | 5/2009 | Burnett | |
| 2010/0196129 A1 | 8/2010 | Buckner | |
| 2010/0263341 A1 | 10/2010 | Lee | |
| 2011/0089122 A1 * | 4/2011 | Smith | B01D 33/056 210/774 |
| 2012/0017553 A1 * | 1/2012 | Park | B04C 5/081 55/432 |
| 2013/0062287 A1 | 3/2013 | Hodges et al. | |
| 2013/0209181 A1 | 8/2013 | Van Arsdale | |
| 2013/0248465 A1 | 9/2013 | Sherwood | |
| 2014/0042246 A1 | 2/2014 | Buckner | |
| 2014/0190904 A1 * | 7/2014 | Sewell | B01D 33/802 210/330 |
| 2014/0224123 A1 | 8/2014 | Walters | |
| 2014/0251376 A1 * | 9/2014 | Baker | B08B 9/053 134/8 |
| 2016/0175745 A1 | 6/2016 | Buckner | |
| 2016/0175749 A1 | 6/2016 | Suda | |

(56) References Cited

U.S. PATENT DOCUMENTS

| | | | |
|---|---|---|---|
| 2016/0273890 A1* | 9/2016 | Wooldridge | F41J 11/00 |
| 2016/0326715 A1 | 11/2016 | Wagner et al. | |
| 2019/0134650 A1* | 5/2019 | Martindale | B01D 45/12 |

FOREIGN PATENT DOCUMENTS

| | | | | |
|---|---|---|---|---|
| CN | 205165163 U | | 4/2016 | |
| CN | 205165163 U | * | 4/2016 | |
| CN | 106731142 A | | 5/2017 | |
| CN | 106731142 A | * | 5/2017 | B01D 33/0353 |
| CN | 107127057 A | | 9/2017 | |
| CN | 107127057 A | * | 9/2017 | |
| DE | 2833511 A1 | | 2/1980 | |
| DE | 4012998 A1 | | 10/1990 | |
| EP | 0820419 B1 | | 1/1998 | |
| EP | 3141693 | | 3/2017 | |
| EP | 3292912 A1 | | 3/2018 | |
| EP | 3292912 A1 | * | 3/2018 | B02C 15/007 |
| GB | 1024091 A | | 3/1966 | |
| GB | 2091672 A | | 8/1982 | |
| KR | 20130116240 A | | 10/2013 | |
| KR | 20140000568 U | | 1/2014 | |
| KR | 20140000568 U | * | 1/2014 | B04C 9/00 |
| KR | 20170125507 A | | 11/2017 | |
| KR | 20170125507 A | * | 11/2017 | B04C 9/00 |
| WO | 2005056149 A2 | | 6/2005 | |
| WO | WO-2005056149 A2 | * | 6/2005 | B01D 45/12 |
| WO | 2008082424 A1 | | 7/2008 | |

OTHER PUBLICATIONS

Thompson Vac Sales Gif, http://www.thompsonvacsales.com/images/works.gif, available before Jul. 14, 2017.
Flow Diagram for Non-Stop Hydro Excavating Vehicle, sold prior to Jul. 14, 2017.
Pam Kleineke, "Vacuum Excavators Give Contractors a Better View at What's Underground", Trenchless Technology, Jun. 5, 2017, 5 pages.
Houston Hydro, "Hydro Excavation Demonstration", https://www.youtube.com/watch?v=pEwIWMjVdT4, available before Jul. 14, 2017.
MR90 Mud Recycler, 9 pages, https:www.ditchwitch.com/trenchless/fluid-management/mr90, available before Jul. 14, 2017.
International Search Report, International Application No. PCT/US2018/041934, 17 pages, dated Nov. 8, 2018.

* cited by examiner

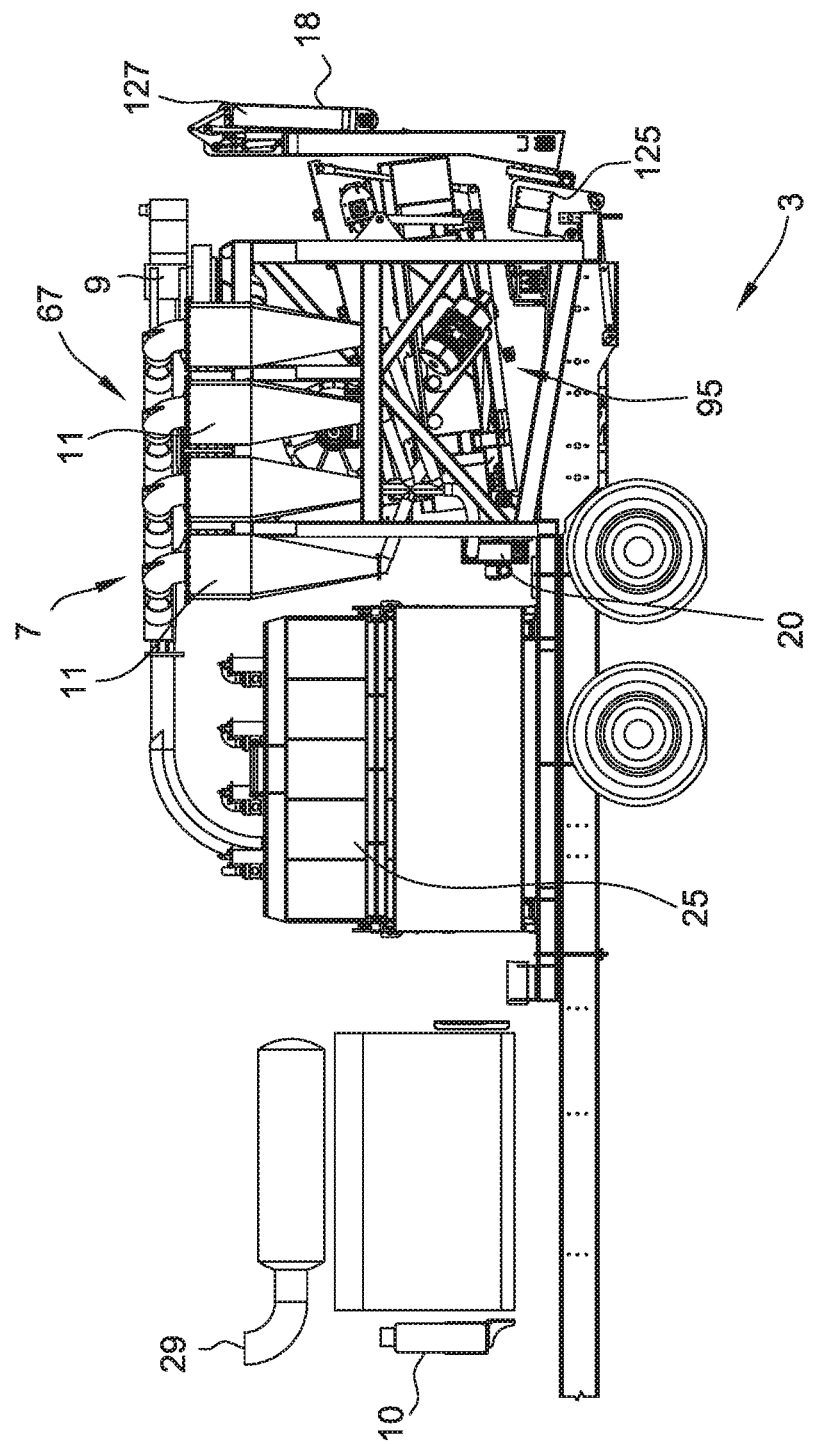

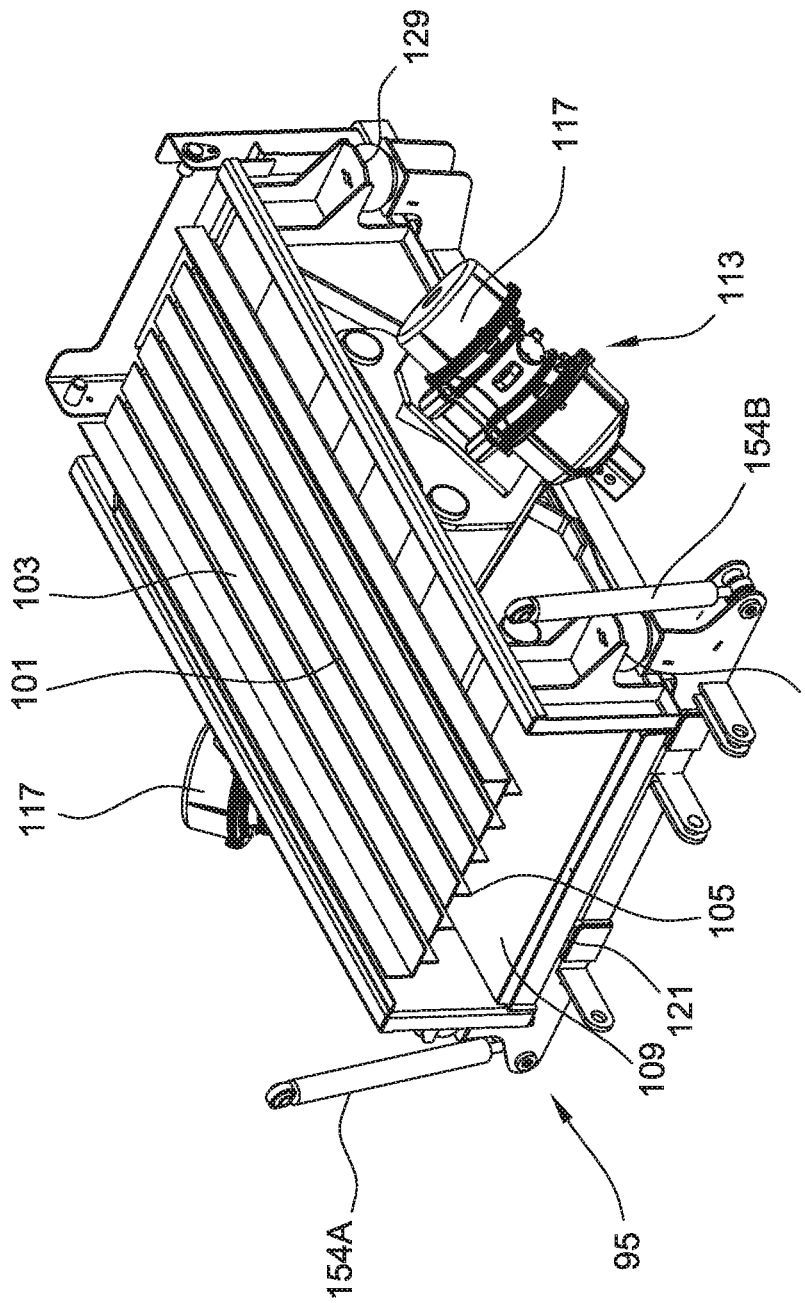

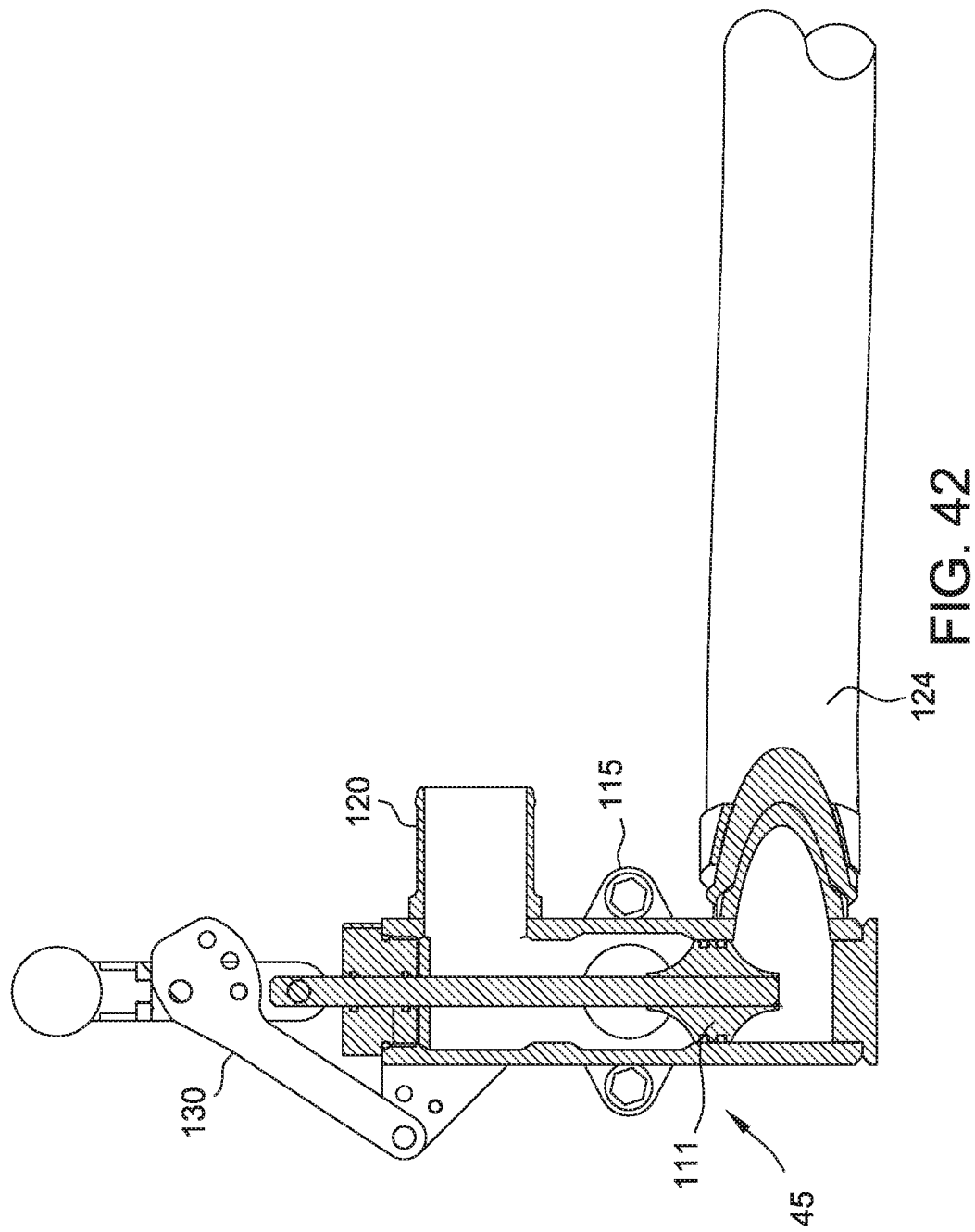

AIRLOCKS FOR CONVEYING MATERIAL, HYDRO EXCAVATION VACUUM APPARATUS HAVING AIRLOCKS, AND METHODS FOR HYDRO EXCAVATING A SITE

CROSS-REFERENCE TO RELATED APPLICATIONS

This application is a Continuation of U.S. patent application Ser. No. 16/630,057, filed Jan. 10, 2020, which is the 35 U.S.C. § 371 national stage of International Patent Application No. PCT/US2018/041934, filed Jul. 13, 2018, which claims the benefit of U.S. Provisional Application No. 62/532,853, filed Jul. 14, 2017, each of which is incorporated herein by reference in its entirety.

FIELD OF THE DISCLOSURE

The field of the disclosure relates to hydro excavation vacuum apparatus and, in particular, mobile excavating apparatus that process spoil material onboard by separating water from the cut earthen material.

BACKGROUND

Hydro vacuum excavation involves directing high pressure water at an excavation site while removing cut earthen material and water by a vacuum system. Sites may be excavated to locate utilities or to cut trenches. The spoil material is removed by entraining the spoil material in an airstream generated by the vacuum system. The spoil material is stored on a vehicle for transport for later disposal of the spoil material. Spoil material is conventionally landfilled or dumped at a designated disposal site. Landfill disposal of spoil material containing a large amount of water may be relatively expensive. Further, tightening regulations may limit disposal options for such slurries.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a hydro excavation vacuum apparatus for excavating earthen material. The apparatus includes a wand for directing pressurized water toward earthen material to cut the earthen material. The wand includes a rotary nozzle for directing water in a rotating, circular path toward the earthen material at an excavation site. The apparatus includes a vacuum system for removing cut earthen material and water from the excavation site in an airstream. The apparatus includes a separation vessel for removing cut earthen material and water from the airstream. An airlock receives material from the separation vessel and discharges the material through an airlock outlet. The apparatus includes a dewatering system for separating water from cut earthen material discharged from the airlock outlet. The dewatering system includes a pre-screen that receives material from the outlet of the airlock. The pre-screen has openings for separating material from the separation vessel by size. The dewatering system includes a vibratory screen for separating material that passes through the pre-screen by size. The vibratory screen has openings sized smaller than the openings of the pre-screen.

Another aspect of the present disclosure is directed to a hydro excavation vacuum apparatus for excavating earthen material. The apparatus includes a wand for directing pressurized water toward earthen material at an excavation site to cut the earthen material. The apparatus includes a vacuum system for removing cut earthen material and water from the excavation site in an airstream. The vacuum is capable of generating a vacuum of at least 18" Hg at 3000 cubic feet per minute. The apparatus includes a separation vessel for removing cut earthen material and water from the airstream. An airlock receives material discharged from the separation vessel and discharges the material through an airlock outlet. The apparatus includes a dewatering system for separating water from cut earthen material discharged from the airlock outlet. The dewatering system includes a pre-screen that receives material from the separation vessel. The pre-screen has openings for separating material from the separation vessel by size. The dewatering system includes a vibratory screen for separating material that passes through the pre-screen by size. The vibratory screen has openings with a size smaller than the size of the openings of the pre-screen. A ratio of the size of the openings of the pre-screen to the size of the openings of the vibratory screen is at least about 100:1.

Yet a further aspect of the present disclosure is directed to a hydro excavation vacuum apparatus for excavating earthen material. The apparatus includes a vacuum system for removing cut earthen material and water from an excavation site in an airstream. The apparatus includes a deceleration system for collecting cut earthen material and water from the airstream. The deceleration system includes a deceleration vessel adapted to reduce a velocity of the airstream to allow material to fall from the airstream. The deceleration vessel has an inlet and a spoil material outlet disposed below the inlet. The deceleration system includes a deflection plate disposed within the deceleration vessel for directing material in the airstream downward toward the spoil material outlet. The apparatus includes a dewatering system for separating water from cut earthen material removed from the excavation site.

Yet another aspect of the present disclosure is directed to a vacuum excavation apparatus for excavating earthen material. The apparatus includes a vacuum system for removing cut earthen material from an excavation site in an airstream. The apparatus includes a deceleration system for collecting cut earthen material from the airstream. The deceleration system includes a deceleration vessel adapted to reduce a velocity of the airstream to allow material to fall from the airstream. The deceleration vessel has a vertical axis and an inlet and a spoil material outlet disposed below the inlet. The deceleration system includes a deflection plate disposed within the deceleration vessel for directing material in the airstream downward toward the spoil material outlet. The deflection plate has a material-engaging face having a longitudinal plane. The longitudinal plane of the material-engaging face forms an angle with the vertical axis of the vessel.

Yet another aspect of the present disclosure is directed to a method for hydro excavating a site with an excavation apparatus. The excavation apparatus includes an excavation fluid pump, a separation vessel and a dewatering system. The excavation fluid pump is operated to direct pressurized water toward an excavation site. The pressurized water cuts earthen material. Cut earthen material and water are removed from the excavation site in an airstream and into the separation vessel. The cut earthen material and water separate from the airstream and fall toward an airlock disposed below the separation vessel. The airstream has an average dwell time of less than about 5 seconds in the separation vessel. Material discharged from the airlock outlet is introduced into the dewatering system. The dewatering system separates water from cut earthen material removed from the excavation site.

In a further aspect of the present disclosure, a hydro excavation vacuum apparatus for excavating earthen material includes a wand for directing pressurized water toward earthen material to cut the earthen material. An excavation fluid pump supplies fluid to the wand to cut the earthen material. The apparatus includes a vacuum system for removing cut earthen material and water from the excavation site and a dewatering system for separating water from cut earthen material removed from the excavation site. The apparatus includes a fluid storage and supply system which receives water from the dewatering system. The fluid storage and supply system includes a first vessel in fluid communication with the excavation fluid pump and a first vessel level sensor for sensing the fluid level in the first vessel. The fluid storage and supply system includes a second vessel. The second vessel is in fluid communication with the dewatering system to receive water discharged from the dewatering system. The fluid storage and supply system includes a second vessel level sensor for sensing the fluid level in the second vessel and a second vessel transfer pump for transferring fluid from the second vessel.

In another aspect of the present disclosure a hydro excavation vacuum apparatus for excavating earthen material includes a wand for directing pressurized water toward earthen material to cut the earthen material. An excavation fluid pump supplies fluid to the wand to cut the earthen material. The apparatus includes a vacuum system for removing cut earthen material and water from the excavation site. The apparatus includes a dewatering system for separating water from cut earthen material removed from the excavation site. The apparatus includes a fluid storage and supply system. The fluid storage and supply system includes a first vessel in fluid communication with the excavation fluid pump. The fluid storage and supply system includes a second vessel. The second vessel is in fluid communication with the dewatering system to receive fluid discharged from the dewatering system. The fluid storage and supply system includes a third vessel for receiving fluid from the second vessel.

An aspect of the present disclosure is directed to a method for hydro excavating a site with an excavation apparatus having at least two vessels for supplying and storing excavation fluid. Maiden water is provided in a first vessel of the apparatus. The maiden water is at an initial level. Pressurized maiden water from the first vessel is directed toward an excavation site. The pressurized water cuts earthen material. Cut earthen material and first cycle water are removed from the excavation site. First cycle water is separated from the cut earthen material. The first cycle water is introduced into a second vessel. Additional maiden water is introduced into the first vessel upon the maiden water level in the first vessel being reduced to below the initial level or less.

In another aspect of the present disclosure directed to a hydro excavation vacuum apparatus for excavating earthen material, the apparatus includes a wand for directing pressurized water toward earthen material to cut the earthen material. An excavation fluid pump supplies fluid to the wand to cut the earthen material. The apparatus includes a vacuum system for removing cut earthen material and water from the excavation site. The apparatus includes a dewatering system for separating water from cut earthen material removed from the excavation site. The apparatus includes a fluid storage and supply system which receives water from the dewatering system. The fluid storage and supply system includes a first vessel and a second vessel. The second vessel is in fluid communication with the dewatering system to receive water discharged from the dewatering system. The fluid storage and supply system includes a third vessel and a valving system for switching the source of water directed through the wand from the first vessel to the second vessel.

Yet a further aspect of the present disclosure is directed to a method for hydro excavating a site with an excavation apparatus having at least two vessels for supplying and storing excavation fluid. Maiden pressurized water from a first vessel is directed toward one or more excavation sites. The first vessel has a volume. The pressurized water cuts earthen material. The volume of maiden pressurized water used for excavation is at least the volume of the first vessel. Cut earthen material and first cycle water are removed from one more excavation sites. First cycle water is separated from the cut earthen material. The first cycle water is introduced into a second vessel. Additional maiden pressurized water is directed toward one or more excavation sites after the volume of the maiden pressurized water used for excavation is at least the volume of the first vessel.

In another aspect of the present disclosure directed to an airlock for conveying material, the airlock includes a plurality of rotatable vanes that form pockets to hold and convey material. The vanes rotate from an airlock inlet to an airlock outlet along a conveyance path. The airlock includes a housing. The housing has a first sidewall, a second sidewall, and an outer annular wall that extends from the first sidewall to the second sidewall. The airlock outlet extends through the outer annular wall. The airlock outlet tapers outwardly from a vertex toward at least one sidewall.

In a further aspect of the present disclosure directed to a method for hydro excavating a site with an excavation apparatus, pressurized water is directed toward an excavation site. The pressurized water cuts earthen material. Cut earthen material and water are removed from the excavation site and into a separation vessel. The cut earthen material and water separate from the airstream and fall toward an airlock disposed below the separation vessel. The airlock has rotating vanes that form pockets to receive cut earthen material and water. The airlock has less than 10 vanes. The vanes of the airlock are rotated at a speed of less than 10 RPM to move cut earthen material and water from an airlock inlet toward an airlock outlet. Material discharged from the airlock outlet is introduced into a dewatering system. The dewatering system separates water from cut earthen material removed from the excavation site.

Another aspect of the present disclosure is directed to a hydro excavation vacuum apparatus for excavating earthen material. The apparatus includes a wand for directing pressurized water toward earthen material to cut the earthen material. The wand includes a rotary nozzle for directing water in a rotating, circular path toward the earthen material at an excavation site. The apparatus includes a vacuum pump for removing cut earthen material and water from the excavation site in an airstream. The vacuum pump is a positive displacement pump. The apparatus includes a separation vessel for removing cut earthen material and water from the airstream. An apparatus includes a conduit for conveying water and cut earthen material from the excavation site to the separation vessel. The conduit has a diameter $D_1$. An airlock receives material from the separation vessel and discharges the material through an airlock outlet. The airlock includes vanes with pockets disposed between adjacent vanes. The vanes are sized to receive particles with a diameter $D_1$ or greater.

An additional aspect of the present disclosure is directed to a hydro excavation vacuum apparatus for excavating earthen material at an excavation site. The apparatus has a lateral axis and includes a wand for directing pressurized water toward earthen material to cut the earthen material. The apparatus includes a vacuum system for removing cut earthen material and water from the excavation site in an airstream. The apparatus includes a separation vessel for removing cut earthen material and water from the airstream. An airlock receives material from the separation vessel and discharges the material through an airlock outlet. The apparatus includes a dewatering system for separating water from cut earthen material. The dewatering system includes at least one screen for separating material by size. The apparatus includes an adjustment system for adjusting a pitch or a roll of the screen. The adjustment system includes an actuator for adjusting the pitch and/or the roll of the screen and a pivot member for adjusting the pitch or the roll of the screen. The pivot member is aligned with the airlock outlet relative to the lateral axis.

An aspect of the present disclosure is directed to a hydro excavation vacuum apparatus for excavating earthen material at an excavation site. The apparatus has a longitudinal axis and includes a wand for directing pressurized water toward earthen material to cut the earthen material. The apparatus includes vacuum system for removing cut earthen material and water from the excavation site in an airstream. The apparatus includes a separation vessel for removing cut earthen material and water from the airstream. An airlock receives material from the separation vessel and discharges the material through an airlock outlet. The apparatus includes a dewatering system for separating water from cut earthen material. The dewatering system includes at least one screen for separating material by size. The screen has a rear toward which material is loaded onto the screen from the airlock outlet and a front toward which material is discharged from the screen. The screen has a center plane midway between the rear and the front. The apparatus includes an adjustment system for adjusting a pitch or a roll of the screen. The adjustment system includes an actuator for adjusting the pitch or the roll of the screen. The adjustment system includes a pivot member for adjusting the pitch and/or the roll of the screen. The pivot member is rearward to the center plane of the screen relative to the longitudinal axis.

In yet another aspect of the present disclosure directed to a hydro excavation vacuum apparatus for excavating earthen material, the apparatus has a longitudinal axis and includes a wand for directing pressurized water toward earthen material to cut the earthen material. The apparatus includes a vacuum system for removing cut earthen material and water from the excavation site in an airstream. The apparatus includes a separation vessel for removing cut earthen material and water from the airstream. The apparatus includes an airlock that receives material from the separation vessel and discharges the material through an airlock outlet. The apparatus includes a dewatering system for separating water from cut earthen material. The dewatering system includes at least one screen for separating material by size. An adjustment system for adjusting a pitch and a roll of the screen includes an actuator for adjusting the pitch or the roll of the screen. The adjustment system includes a pivot member for adjusting the pitch and the roll of the screen. The pivot member includes a first portion to adjust the roll of the screen and a second portion to adjust the pitch of the screen.

Yet a further aspect of the present disclosure is directed to a cyclonic separation system for separating material entrained in an airstream. The system includes one or more cyclones for separating material from the airstream. The one or more cyclones have a solids outlet. The system includes a sealed conveyor with the one or more cyclones discharging material directly into the conveyor through the solids outlet. The system includes a discharge pump with the sealed conveyor discharging material into the discharge pump.

Yet another aspect of the present disclosure is directed to a hydro excavation vacuum apparatus for excavating earthen material. The apparatus includes a wand for directing pressurized water toward earthen material to cut the earthen material. An excavation fluid pump supplies fluid to the wand to cut the earthen material. The apparatus includes a vacuum system for removing cut earthen material and water from an excavation site and includes a dewatering system for separating water from cut earthen material removed from the excavation site. The apparatus includes a fluid storage and supply system that receives water from the dewatering system. The fluid storage and supply system includes a discharge manifold for offloading water from the fluid storage and supply system. The system includes a first vessel and a second vessel. The second vessel is in fluid communication with the dewatering system to receive water discharged from the dewatering system. The system includes a transfer pipe for transferring fluid from the first vessel to an excavation fluid pump. The system includes a valve for selectively directing fluid from the first vessel between (1) the transfer pipe and (2) the discharge manifold.

Yet a further aspect of the present disclosure is directed to a method for filling a fluid storage and supply system of a hydro vacuum excavation apparatus. The fluid storage and supply system includes a first vessel, a second vessel for receiving water from a dewatering system, a third vessel, and a manifold connected to the first, second and third vessels. Water is added to the first vessel. One or valves are actuated such that the first vessel is in fluid communication with the manifold and the third vessel is in fluid communication with the manifold. A first vessel transfer pump is operated to transfer water from the first vessel, into the manifold and into the third vessel.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 2 is a right side view of the hydro excavation vacuum apparatus;

FIG. 9 is a perspective view of a dewatering system;

FIG. 42 is a side view of a valve of the fluid storage and supply system.

Corresponding reference characters indicate corresponding parts throughout the drawings.

DETAILED DESCRIPTION

Figure 1:
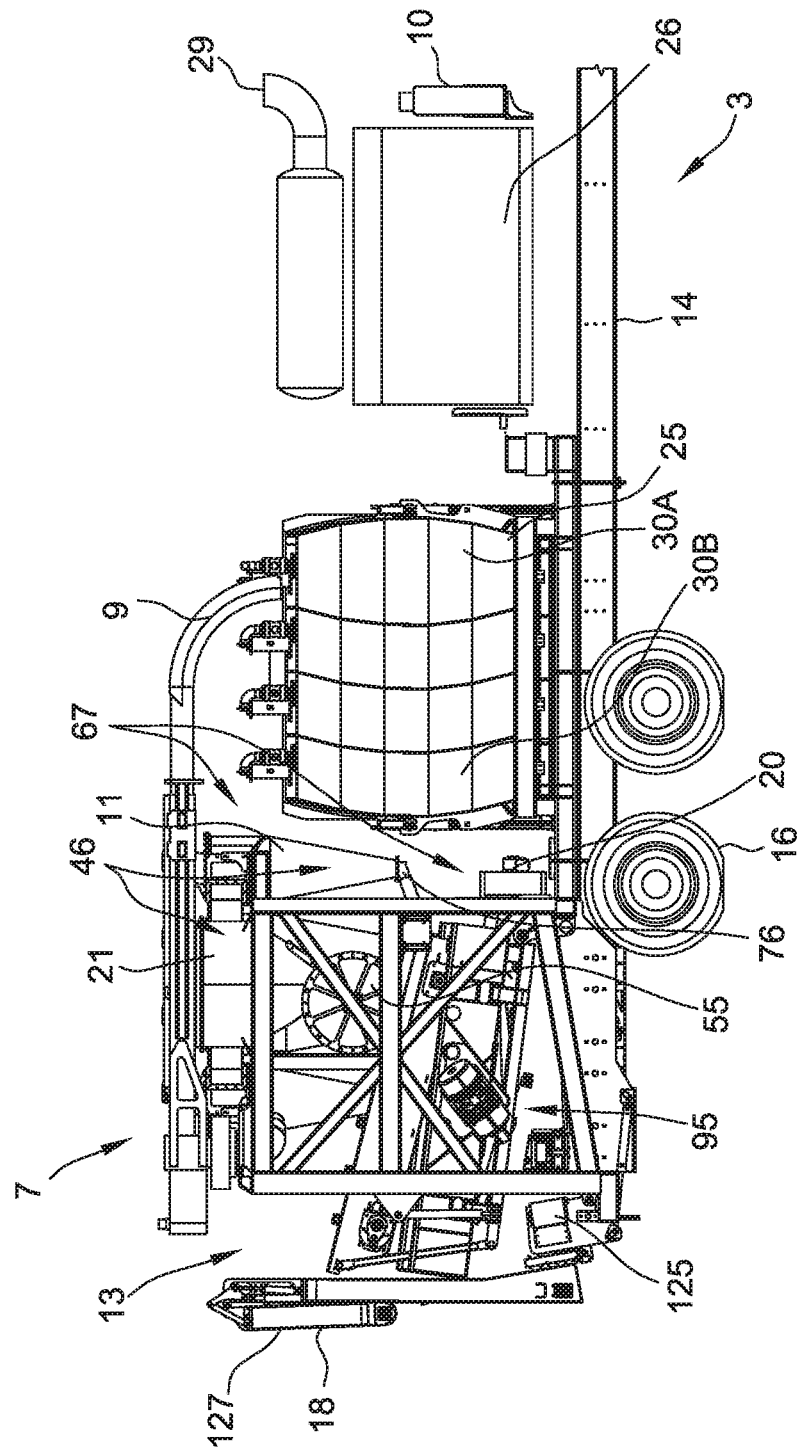
FIG. 1 is a left side view of a hydro excavation vacuum apparatus.

An example hydro excavation vacuum apparatus 3 for excavating earthen material is shown in FIG. 1. As described in further detail herein, the hydro excavation vacuum apparatus 3 is used to excavate a site by use of a jet of high pressure water expelled through a wand. The cut earthen material and water are removed by a vacuum system and are processed onboard the apparatus by separating the cut earthen material from the water. Processed water may suitably be used for additional excavation or disposed. Recovered earthen material may be used to backfill the excavation site or disposed.

The hydro excavation vacuum apparatus 3 may include a chassis 14 which supports the various components (e.g., vacuum system, separation vessel, airlock and/or dewatering system) with wheels 16 connected to the chassis 14 to transport the apparatus 3. The apparatus 3 may be self-propelled (e.g., with a dedicated motor that propels the apparatus) or may be adapted to be towed by a separate vehicle (e.g., may include a tongue and/or hitch coupler to connect to the separate vehicle).

The hydro excavation vacuum apparatus 3 includes a dedicated engine 26 that powers the various components such as the excavation pump, vacuum pump, vibratory screens, conveyors and the like. In other embodiments, the engine 26 is eliminated and the apparatus is powered by a motor that propels the apparatus or the apparatus 3 is powered by other methods.

The apparatus 3 includes a front 10, rear 18, and a longitudinal axis A (FIG. 3A) that extends through the front 10 and rear 18 of the apparatus 3. The apparatus 3 includes a lateral axis B that is perpendicular to the longitudinal axis A.

High Pressure Excavation and Vacuum System

The hydro excavation vacuum apparatus 3 includes a wand 4 (FIG. 3B) for directing pressurized water W toward earthen material to cut the earthen material. The wand 4 is connected to an excavation fluid pump 6 that supplies water to the wand 4. The pump 6 may supply a pressure of, for example, at least about 500 psi or at least about 1,000 psi (e.g., from about 1,000 psi to about 5,000 psi or from 1,000 psi to about 3,000 psi).

In some embodiments, the wand 4 includes a rotary nozzle 8 (FIG. 3C) for directing water W toward the earthen material to cut the earthen material. Generally, any rotary nozzle that causes the water to be directed toward the earthen material in a circular path at the site of the excavation may be used. Such rotary nozzles may include a rotor insert with blades that rotate around a longitudinal axis of the nozzle when water is forced through the nozzle. The rotor insert may include three or more channels that force fluid to flow in different pathways through the rotor insert to cause the water to move along a circular path as it contacts the excavation material (i.e., the water moves within a cone that extends from the nozzle toward the excavated material). In other embodiments, a straight tip nozzle that directs fluid along a straight path in a concentrated jet may be used.

The hydro excavation vacuum apparatus 3 includes a vacuum system 7 (FIG. 1) for removing spoil material from the excavation site. Spoil material or simply "spoils" may include, without limitation, rocks, cut earthen material (e.g., small particulate such as sand to larger pieces of earth that are cut loose by the jet of high pressure water), slurry, and water used for excavation. The spoil material may have a consistency similar to water, a slurry, or even solid earth or rocks. The terms used herein for materials that may be processed by the hydro excavation vacuum apparatus 3 such as, for example, "spoils," "spoil material," "cut earthen material" and "water", should not be considered in a limiting sense unless stated otherwise.

The vacuum system 7 includes a boom 9 that is capable of rotating toward the excavation site to remove material from the excavation site. The boom 9 may include a flexible portion 5 (FIG. 3B) that extends downward to the ground to vacuum spoil material from the excavation site. The flexible portion 5 may be manipulated by a user to direct the vacuum suction toward the excavation site.

The vacuum system 7 acts to entrain the cut earth and the water used to excavate the site in a stream of air. A blower or vacuum pump 24 (FIG. 3B) pulls a vacuum through the boom 9 to entrain the material in the airstream. Air is discharged from the blower 24 after material is removed from the airstream.

The airstream having water and cut earth entrained therein is pulled through the boom 9 and through a series of conduits (e.g., conduit 47 shown in FIG. 6) and is pulled into a separation vessel 21, described further below. The separation vessel 21 removes at least a portion of cut earthen material and water from the airstream. Air exits one or more separation vessel air outlets 49 and is introduced into cyclones 11 (FIG. 2) to remove additional spoil material (e.g., water, small solids such as sand, low density particles such as sticks and grass, and the like) not separated in the separation vessel 21. Material that collects in the bottom of the cyclones 11 is conveyed by a cyclone discharge pump 20 (FIG. 1) (e.g., peristaltic pump described in further detail below) or, alternatively, is gravity fed to the dewatering system 95 described below. The air removed from the cyclones 11 is introduced into one or more filter elements before entering the vacuum pump 24. The vacuum pump 24 may be disposed in or near the engine compartment 26 (FIG. 1). Air is removed from the apparatus through a vacuum exhaust 29.

The vacuum pump 24 generates vacuum in the system to pull water and cut earthen material into the apparatus 3 for processing. In some embodiments, the vacuum pump 24 is a positive displacement pump. Such positive displacement pumps may include dual-lobe or tri-lobe impellers (e.g., a screw rotor) that draw air into a vacuum side of the pump and forces air out the pressure side. In some embodiments, the pump is capable of generating a vacuum of at least 18" Hg and/or a flow rate of at least about 3000 cubic feet per minute. The pump may be powered by a motor having a power output of, for example, at least 75 hp, at least 100 hp or even at least 125 hp.

Separation System for Removing Spoil Material from the Airstream

The separation vessel 21 and cyclones 11 are part of a separation system 46 for removing spoil material from the airstream. The separation vessel 21 is a first stage separation in which the bulk of spoil material is removed from the airstream with carryover material in the airstream being removed by the cyclones 11 in a second stage (i.e., the separation vessel 21 is the primary separation vessel with the downstream cyclones 11 being secondary separation vessels).

Figure 6:
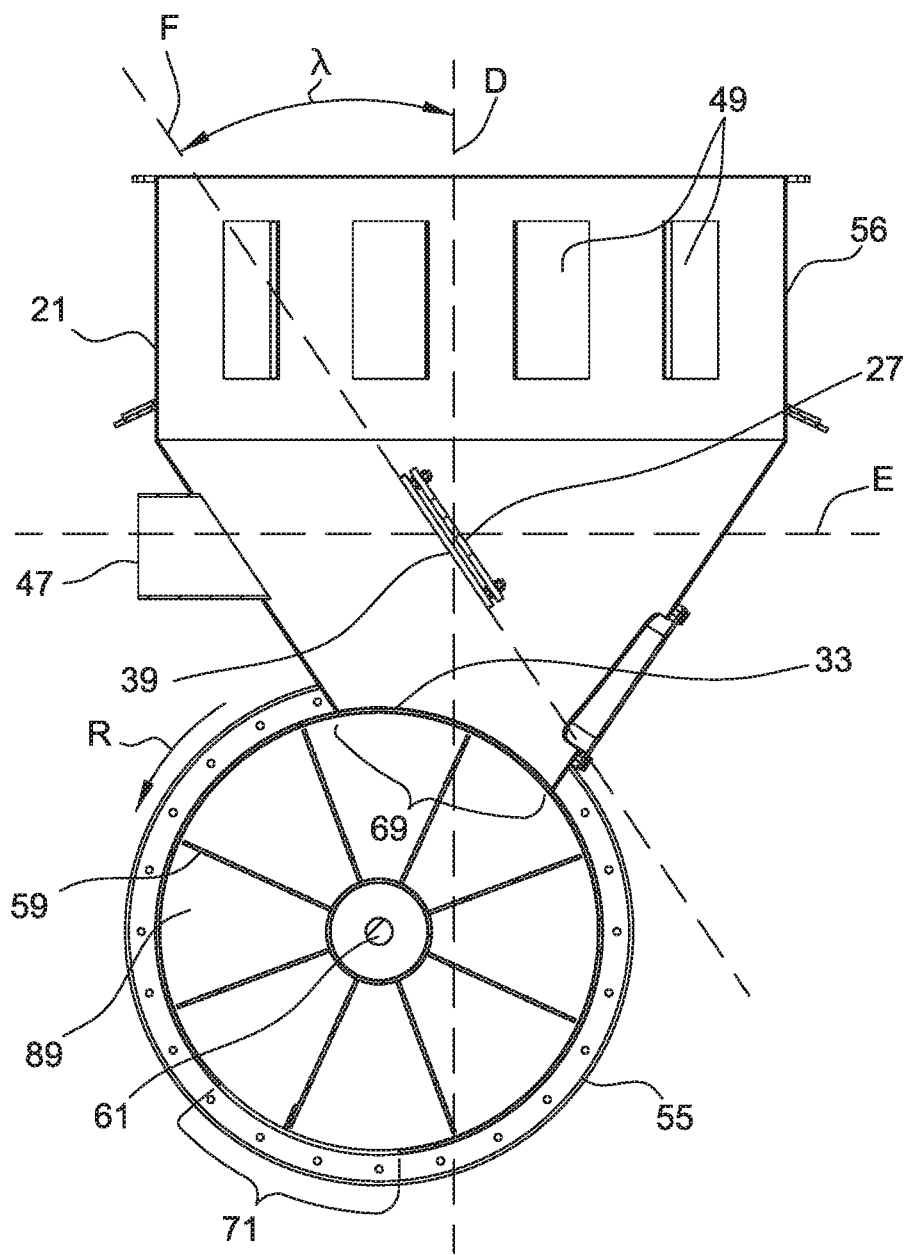
FIG. 6 is a side view of the deceleration vessel and airlock.

Spoil material containing water and cut earth is introduced into the separation vessel 21 through inlet conduit 47 (FIG. 6). At least a portion of spoil material falls from the airstream to a spoil material outlet 33 and into an airlock 55. Air removed through air outlets 49 is processed in cyclones 11 (FIG. 2) to remove at least a portion of carryover spoil material.

Figure 3A:
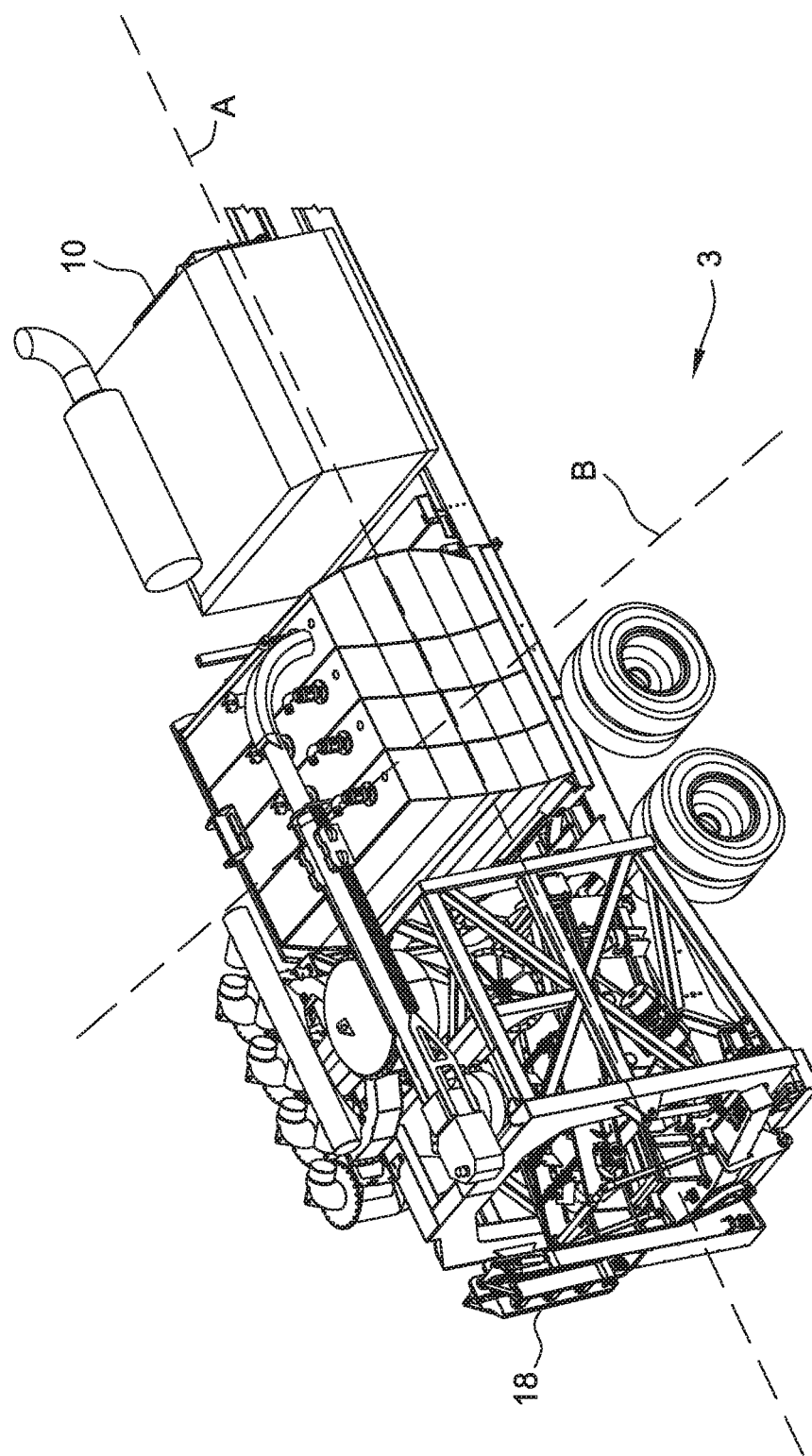
FIG. 3A is a perspective view of the hydro excavation vacuum apparatus.
Figures 3B, 3C:
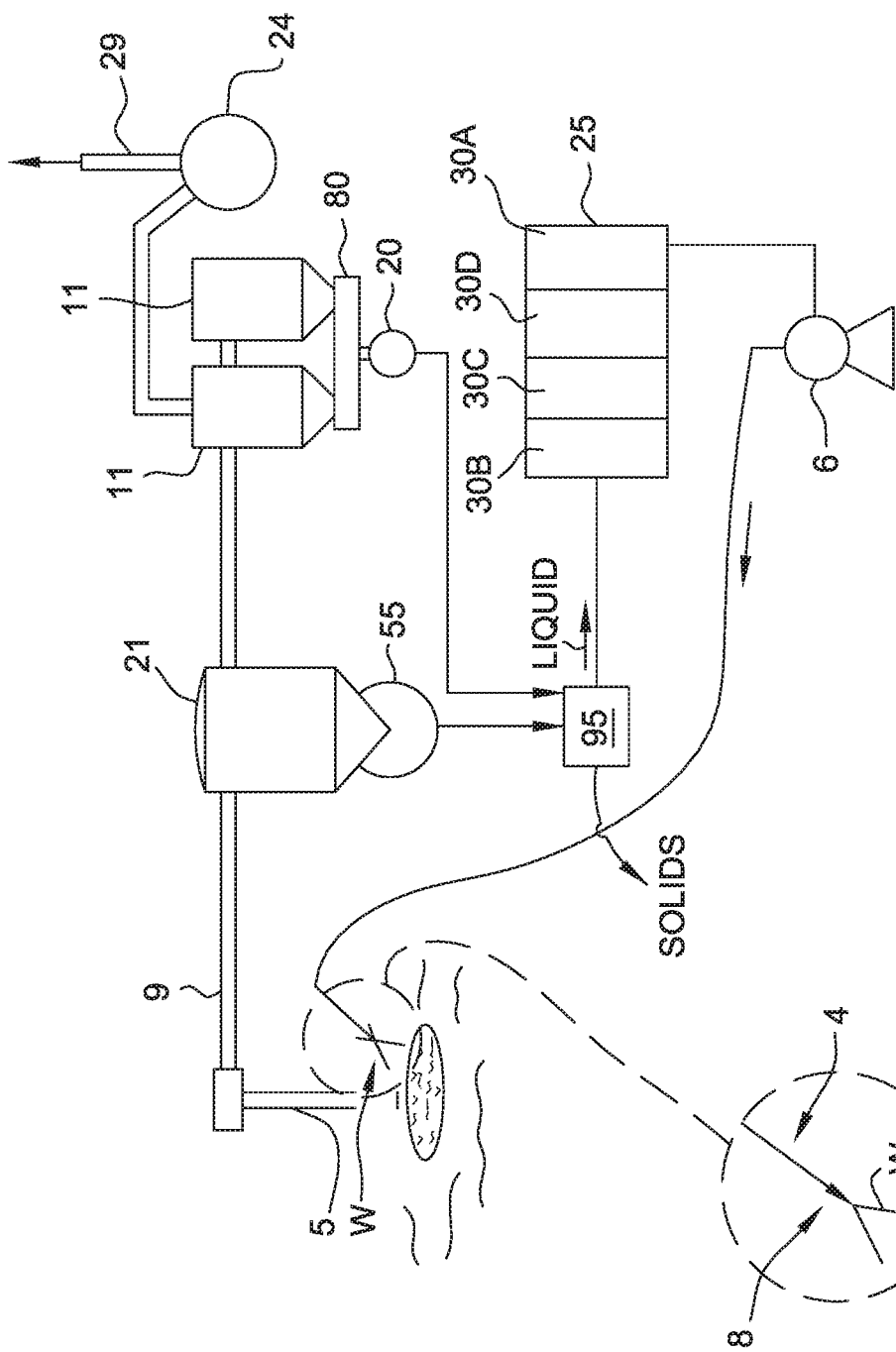
FIG. 3B is a schematic of water and air flow in the hydro excavation vacuum apparatus.
FIG. 3C is a detailed schematic view of the wand and wand nozzle.

Typically the particle size of spoils entering the cyclones 11 will be smaller than spoil particles removed by the separation vessel 21. Spoils removed from the air by the cyclones 11 are typically fluidic. Spoil material removed by the cyclones 11 is fed by the cyclone discharge pump 20 (FIG. 1) to the dewatering system 95 described further below (e.g., directly to a vibratory screen). Air exiting the cyclones 11 passes through a filter element before entering the vacuum pump 24 (FIG. 3B). The air is pulled through the vacuum pump 24 and exits the apparatus through the air exhaust 29.

The separation vessel 21 has an inlet 31 (FIG. 5) and a spoil material outlet 33 disposed below the inlet 31. An air outlet 49 (FIG. 6) is disposed above the inlet 31. In the illustrated embodiment, the separation vessel 21 includes a plurality of air outlets 49. In other embodiments, the separation vessel 21 may include a single air outlet 49. The outlets 49 are fluidly connected to the cyclones 11 (FIG. 2) to separate material that remains entrained in the airstream withdrawn from the outlets 49.

Figure 35:
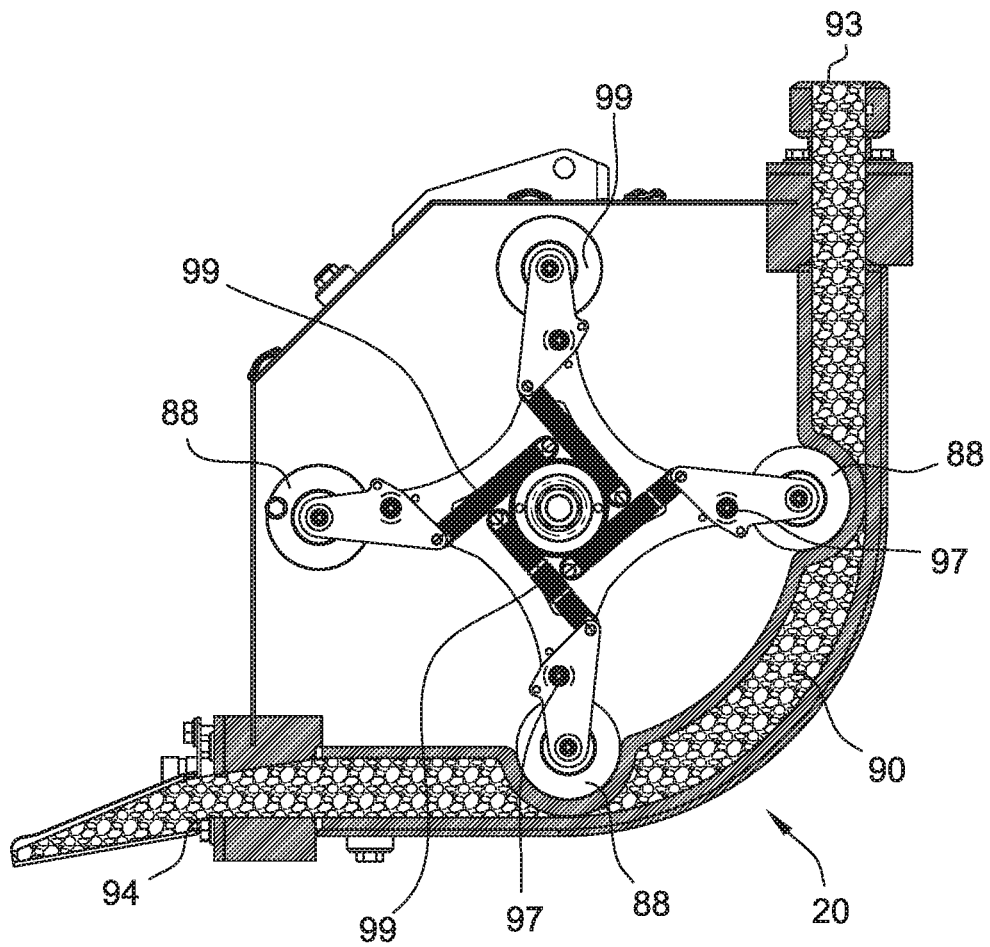
FIG. 35 is a side view of a peristaltic pump.

The cyclones 11 may be part of a cyclonic separation system 67 (FIG. 1). As shown in FIG. 1, the cyclonic separation system 67 includes the cyclones 11 and the cyclone discharge pump 20. In the embodiment illustrated in FIG. 1, the cyclone discharge pump is a peristaltic pump that is connected to the cyclone discharge 76 by conduits (e.g., hoses or ducts). An example peristaltic pump 20 is shown in FIG. 35 described further below.

Figure 31:
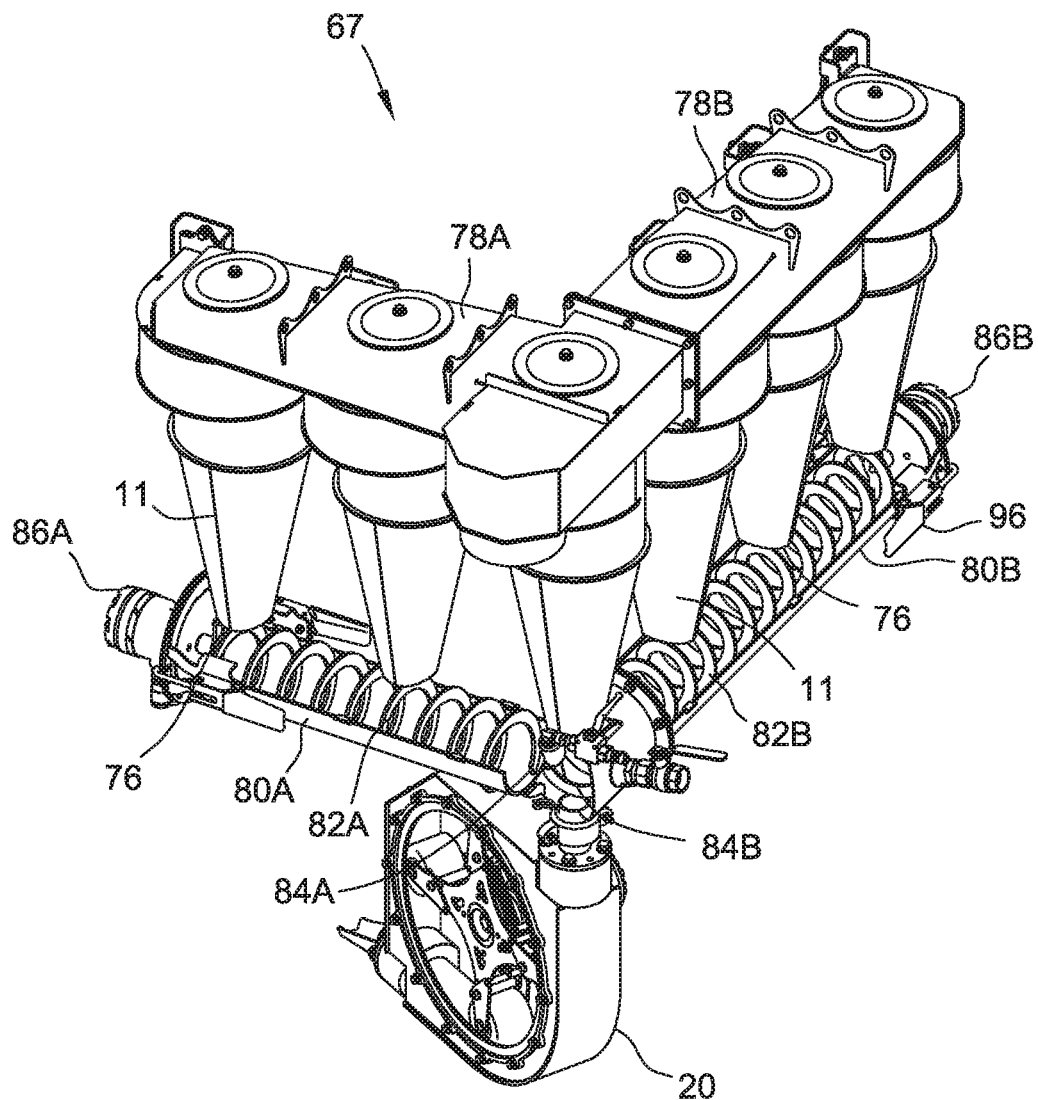
FIG. 31 is a perspective view of a cyclonic separation system showing the screws of the conveyors.
Figure 32:
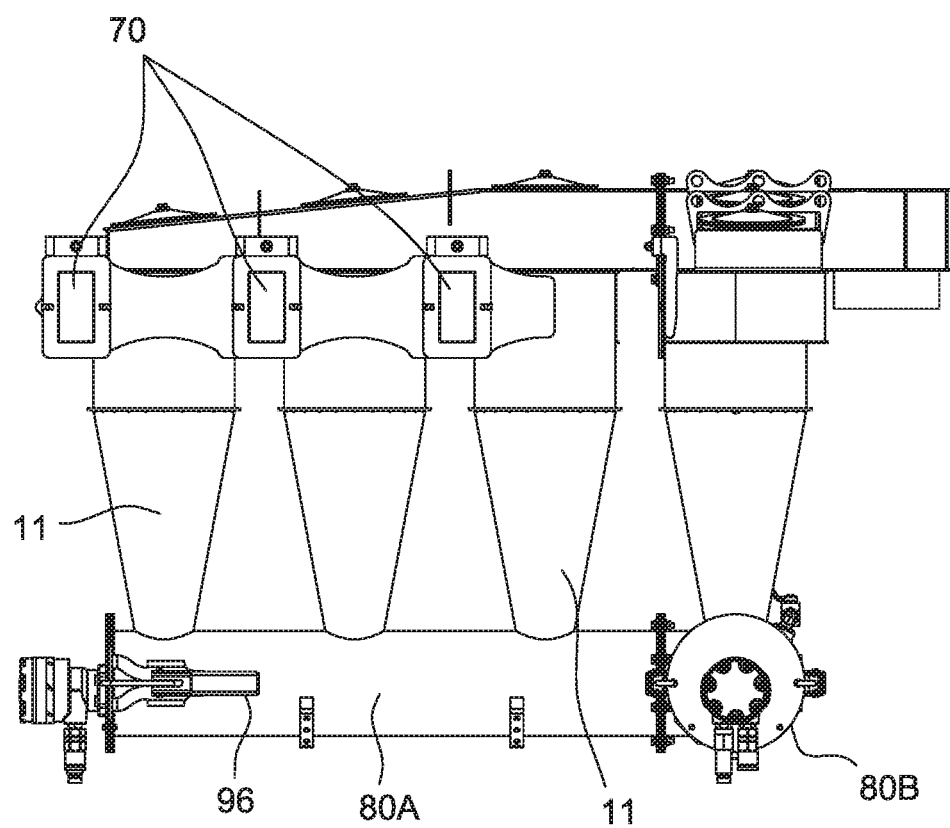
FIG. 32 is a side view of the cyclonic separation system.

Another embodiment of the cyclonic separation system 67 is shown in FIGS. 30-34. The cyclones 11 receive airflow from the separation vessel outlets 49 (FIG. 4) through cyclone inlets 70 (FIG. 32). Cyclonic action in the cyclones 11 causes entrained material to fall to the cyclone solids outlet 76 (FIG. 31). It should be noted that "solids outlet" should not be considered in a limiting sense and any type of material may fall through the solids outlet 76 (e.g., water, mud, sand, sticks, etc.). Air is pulled through the cyclones 11 and is discharged through cyclone discharge manifolds 78A, 78B and is directed to one or more filter elements before entering the vacuum pump 24 (FIG. 3B).

The cyclone solids outlets 76 should be sized to reduce or prevent bridging of granular material that passes through the outlets 76. The cyclone solids outlets 76 are fluidly connected to conveyors 80A, 80B (e.g., the outlets 76 are formed in the conveyor housing 98). The conveyors 80A, 80B are sealed to reduce or prevent air from entering the vacuum system through the conveyors 80A, 80B (e.g., having gaskets or bearings or the like that seal the conveyor from the ambient atmosphere). In the illustrated embodiment, the conveyors 80A, 80B are screw conveyors (e.g., an auger) having a rotating screw 82A, 82B (FIG. 31). As shown in FIG. 31, the screw conveyor may be a centerless screw conveyor (i.e., lacking a center shaft). In other embodiments, the screw conveyor may include a center shaft. In yet other embodiments, the one or more conveyors 80 may be slat conveyors, belt conveyors or rotary vane conveyors.

Figure 33:
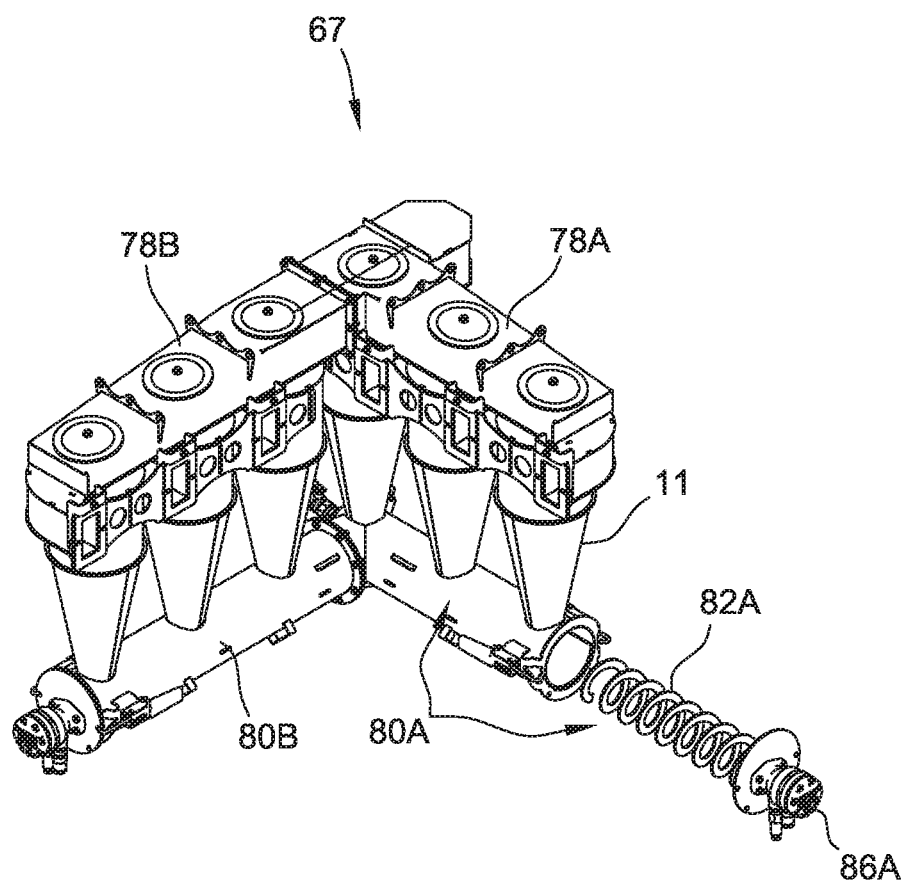
FIG. 33 is a perspective view of the cyclonic separation system showing the screw and motor of a conveyor removed from the conveyor housing.

The conveyors 80 are powered by motors 80A, 80B which may be quick-attach motors to facilitate clean-out of the conveyors 80. The conveyors 80 include access clamps 96 (FIGS. 30-32) that may be opened to allow the motors 86 and screw 82 to be removed the conveyor housing 98 (FIG. 34) as shown in FIG. 33. The conveyor screw 82 may be connected to the motor 86 to allow both the motor and screw to be removed from the conveyor housing as a single piece.

Figure 34:
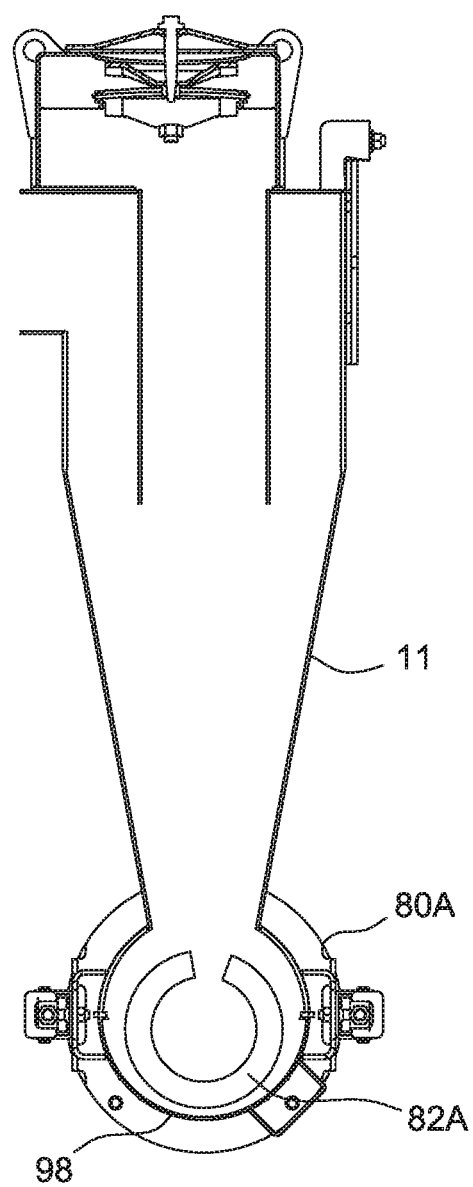
FIG. 34 is a cross-section view of the cyclonic separation system.

The longitudinal axis $A_{80}$ (FIG. 30) of the conveyors 80A, 80B is generally orthogonal to the longitudinal axis $A_{11}$ of the cyclones 11. The conveyors 80 may be sized and shaped to allow the conveyor to accept surges of material relatively quickly to reduce or prevent bridging of material through cyclone outlets 76. As shown in FIG. 34, the conveyor screw 82 may be off-center with the center of the screw 82 being closer to the bottom of the housing 98 (FIG. 34) (i.e., the screw 82 is undersized compared to the housing 98).

The cyclonic separation system 67 may generally include any number of cyclones 11 and conveyors 80 (e.g., one conveyor, two conveyors or more and/or at least one cyclone, at least two, at least three, at least four, at least five, at least six or more cyclones 11). The cyclonic separation system 67 generally does not include an airlock unless stated otherwise.

Figure 36:
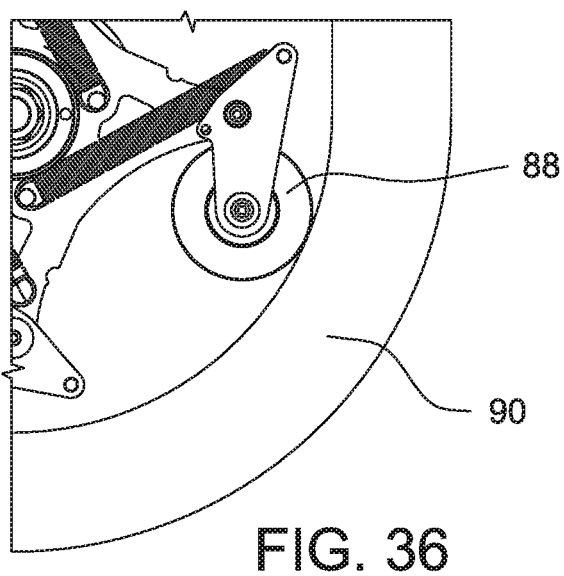
FIG. 36 is a side view of a roller of the peristaltic pump in a retracted position.

The conveyors 80 convey material toward conveyor outlets 84A, 84B (FIG. 31) where the material is discharged into the cyclone discharge pump 20. In some embodiments, the cyclone discharge pump 20 is a peristaltic pump. The peristaltic pump 20 seals the system 67 by reducing the amount of air that may enter the system 67. Referring now to FIG. 35, such peristaltic pumps may include a plurality of rollers 88 that rotate about the pump. The rollers 88 compress a hose or tube 90 in succession as they rotate to push material through a pump outlet 94. In the illustrated embodiment, the pump 20 includes four rollers 88. In other embodiments, more or less than four rollers 88 may be used. The rollers 88 may be configured to retract as shown in FIG. 36 (e.g., as when the pump 20 is not in operation). Configuring the rollers 88 to retract while not in operation allows the pump 20 to receive material that is discharged from the cyclones 11 during storage and transportation. Retraction of the rollers 88 also assists in winterization, cleaning, and replacement of the tube 90 and may extend the life of the tube 90.

The rollers 88 may pivot about a pivot pin 97 to retract with a biasing element 99 (e.g., spring) biasing the rollers in an extended position. Retraction of the rollers 88 may be automated by configuring the pump to reverse to cause the rollers 88 to retract when the pump 20 is switched off.

In the embodiment of FIG. 35, material may fall by gravity through the pump inlet 93 and into the hose 90. Material discharged from the pump 20 is conveyed to the dewatering system 95 (FIG. 37) through outlet 94.

Figure 37:
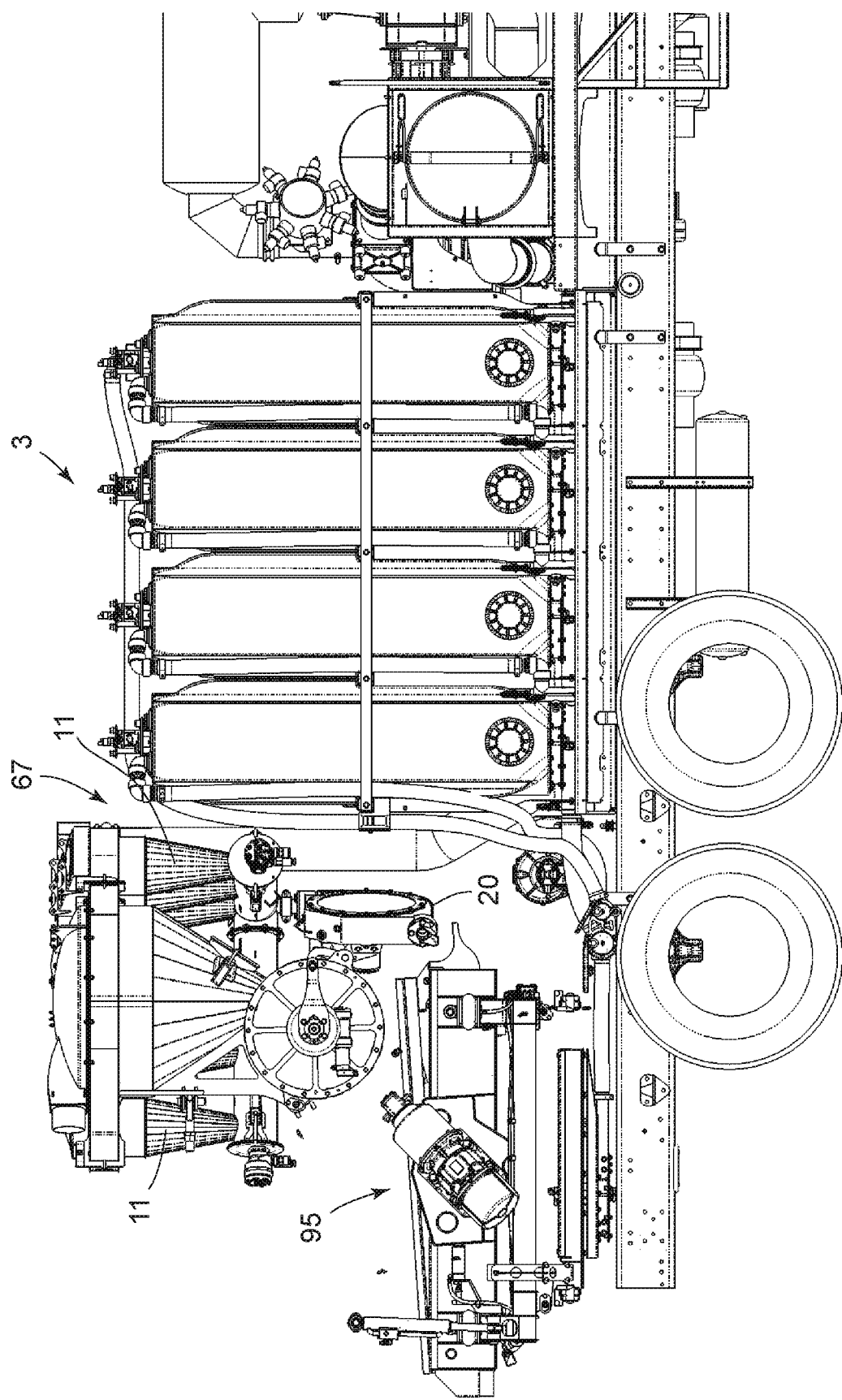
FIG. 37 is a side view of the cyclonic separation system as part of a hydro excavation vacuum apparatus.

The cyclonic separation system 67 may be part of the hydro excavation vacuum apparatus 3 as shown in FIG. 37 or may be used in other applications such as in reclaimers (e.g., drill fluid reclaimers).

The separation vessel 21 includes an upper portion 51 (FIG. 4) having a sidewall 56 and one or more air outlets 49 formed in the sidewall 56. The vessel 21 includes a lower portion 57 that tapers to the spoil material outlet 33 (FIG. 5). The upper portion 51 and lower portion 57 may be adapted (e.g., shaped), at least in part to ease manufacturing, for fit-up and for minimizing the potential for creating internal surface features where material could set and build-up in the inner surfaces of the separation vessel 21.

In the illustrated embodiment, the lower portion 57 is conical. The conical lower portion 57 may be arranged (e.g., with a sufficient slope) to reduce potential for cut earthen material to collect on the lower portion 57. The illustrated lower portion 57 of the separation vessel 21 has a circular, cross-section to eliminate internal corners where cuttings may set and build-up. In other embodiments, the lower portion 57 may have a non-circular cross-sectional profile. For example, the lower portion 57 may include a generally square profile with relatively large fillets at each corner. In the illustrated embodiment, the upper portion 51 has a circular or generally circular cross-section. The upper portion 51 may be cylindrical to ease the transitioning to the conical lower portion 57.

The inlet 31 extends through the conical lower portion 57. In other embodiments, the inlet extends through the upper portion 51. The vessel 21 has a central vertical axis D (FIG. 6).

The separation vessel 21 may be sized to reduce the dwell time of material in the vessel. The dwell time (DT) may be determined from the following formula:

$$DT=Vol/Q$$

where Vol is the open volume of the vessel (i.e., volume not taken up by spoil material) and Q is the volumetric rate (e.g., actual CFM) at which air is pulled by the vacuum system 7. In some embodiments, the dwell time may be less than 5 seconds, less than 3 seconds or less than 1 second (at standard cubic feet).

In some embodiments, the apparatus 3 includes a single separation vessel 21 in the first stage removal of solids and water from the airstream. In other embodiments, two or more separation vessels 21 are operated in parallel in the first stage removal of solids and water from the airstream. In some embodiments, the separation vessel 21 processes from 0.5 ft$^3$ of spoil material per minute to 2.5 ft$^3$ of spoil material per minute.

In the illustrated embodiment, the separation vessel 21 is a deceleration vessel in which the velocity of the airstream is reduced causing material to fall from the airstream toward a bottom of the separation vessel 21. The deceleration vessel 21 may be part of a deceleration system (FIG. 4) for removing material from the airstream by gravity.

The deceleration vessel 21 is adapted to allow material to fall from the airstream by gravity rather than by vortexing of air within the vessel 21. In some embodiments, the inlet 31 of the vessel 21 is arranged such that the airstream does not enter the vessel 21 tangentially. For example, as shown in FIGS. 5 and 6, the inlet conduit 47 (and inlet 31) may have a longitudinal axis E that passes through the central vertical axis D of the deceleration vessel 21. In other embodiments, the longitudinal axis E is separated a relatively small amount from the central vertical axis D of the deceleration vessel 21 (e.g., by a distance less than 33% of the radius of vessel 21 or a distance less than 25%, 15%, 10% or 5% of the radius of the vessel 21).

To allow material to fall from the airstream, the deceleration vessel 21 may have an effective cross-sectional area (i.e., cross-sectional area of void space) larger than the cross-sectional area of the inlet conduit 47 to reduce the velocity of the airstream in the vessel 21. For example, the ratio of the effective cross-sectional area of the deceleration vessel 21 to the effective cross-sectional area of the inlet conduit 47 may be at least about 7.5:1 or, as in other embodiments, at least about 10:1, at least about 15:1 or even at least about 20:1 to reduce the velocity of the airstream to allow material to fall from the airstream.

In the illustrated embodiment in which the deceleration vessel 21 and inlet conduit 47 are circular, the effective cross-sectional area of the deceleration vessel 21 is proportional to the squared radius of the upper portion 51 of the deceleration vessel 21 and the effective cross-sectional area of the inlet conduit 47 is proportional to the squared radius of the inlet conduit 47. In some embodiments, the ratio of the radius of the deceleration vessel 21 to the radius of the inlet conduit may be at least about 3:1, at least about 4:1, or even at least about 5:1.

The deceleration system 23 also includes a deflection plate 27 disposed within the deceleration vessel 21. The deflection plate 27 is configured and positioned to cause spoil material entrained in the airstream to contact the plate 27 and be directed downward toward the spoil material outlet 33. The deflection plate 27 includes a material-engaging face 39 (FIG. 6) configured to contact material entrained in the airstream. The face 39 has a longitudinal plane F and the plane F forms an angle λ with the vertical axis D of the vessel 21. In some embodiments, the angle λ between the longitudinal plane F of the material-engaging face 39 of the deflection plate 27 and the vertical axis D of the vessel 21 may be from about 5° to about 75° or from about 5° to about 60°.

As shown in FIG. 6, the longitudinal axis E of the inlet conduit 47 (and inlet 31) may intersect the deflection plate 27. Alternatively or in addition, the central vertical axis D may intersect the deflection plate 27 or the plate may be forward or rearward to the central vertical axis D (e.g., forward or rearward up to 10% of the radius or forward or rearward up to 25%, 50% or 75% of the radius of the vessel).

Figure 7:
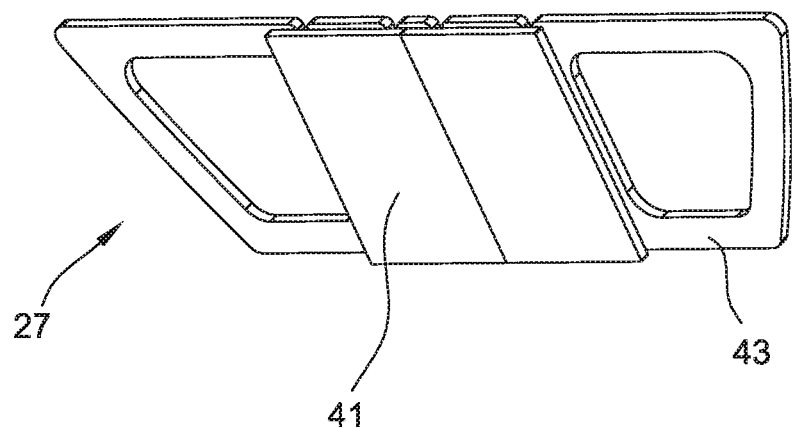
FIG. 7 is a perspective view of the deflection plate.

In some embodiments and as shown in FIG. 7, the deflection plate 27 includes a wear plate 41 connected to a support 43 to allow the wear plate 41 to be replaced upon the plate 41 becoming worn. The wear plate 41 may be made of an abrasion resistant material including steel (e.g., AR400 abrasion resistant steel) or abrasion resistant plastics.

In other embodiments, a separation vessel 21 using cyclonic separation (i.e., a cyclone) in which airflow travels in a helical pattern is used to remove material from the airstream.

Airlock

Figure 8A:
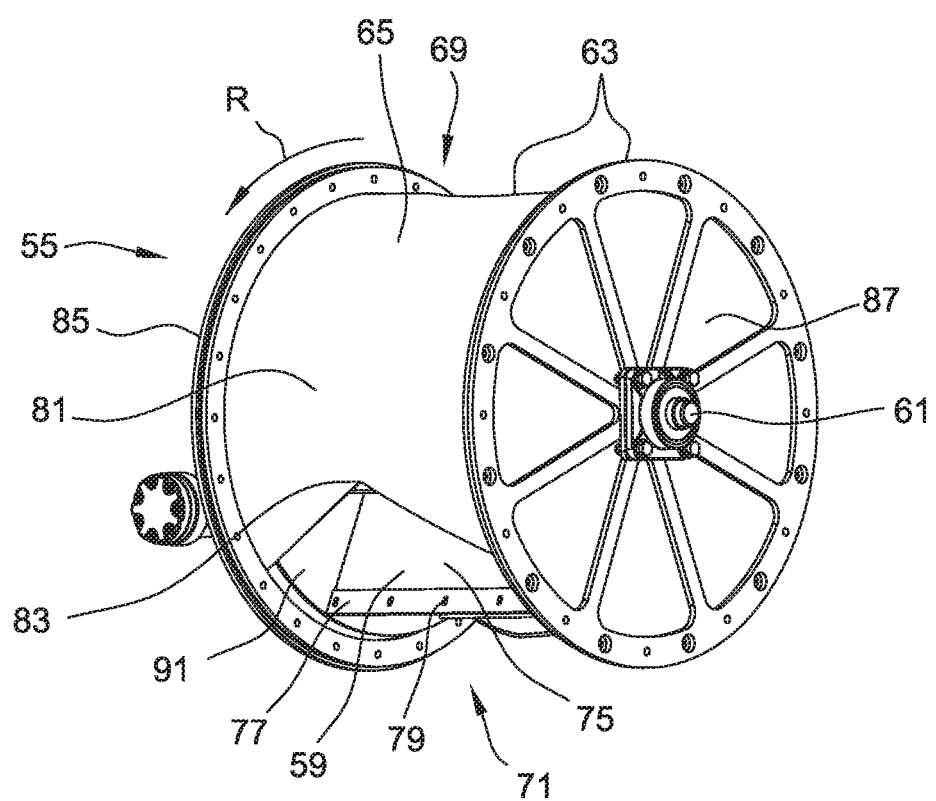
FIG. 8A is a perspective view of the airlock.

An example airlock 55 is shown in FIGS. 6 and 8A. The airlock 55 includes a plurality of rotatable vanes 59 connected to a shaft 61. The vanes 59 rotate along a conveyance path in the direction shown by arrow R in FIG. 6. The shaft 61 is connected to a motor 58 (FIG. 4) that rotates the shaft 61 and vanes 59. The airlock 55 has an airlock inlet 69 through which material passes from the deceleration vessel 21 and an airlock outlet 71 through which water and cut earthen material are discharged.

The airlock 55 includes a housing 63 (FIG. 8A) with the vanes 59 rotating within the housing 63. The housing 63 includes a first sidewall 85, a second sidewall 87, and an outer annular wall 81 that extends between the first sidewall 85 and the second sidewall 87.

The vanes 59 include a main portion 75 and an outer wear strip 77 that is connected to the main portion 75 by fasteners 79. The outer wear strip 77 extends toward the outer annular wall 81 of the housing 63. During rotation, there may be a small gap between the wear strip 77 and the outer annular wall 81 of the housing 63. Material may lodge between the wear strip 77 and the annular wall 81 causing the wear strip to wear. As the strip 77 wears, it may be adjusted outward (e.g., by use of slots in the strip 77 through which the fasteners 79 extend). Alternatively, the strip 77 may be replaced when it is worn out or no longer functional.

Air may pass from the ambient environment, through the gaps between the vanes 59 or wear strips 77 and the outer annular wall 81 and into the vacuum system 7 (FIG. 1). In other embodiments, the vanes 59 contact the outer annular wall 81 (e.g., as with wiper vanes) to more fully seal air from the vacuum system 7.

As shown in FIG. 8A, the airlock outlet 71 has a vertex 83. Proceeding in the direction of rotation of the vanes 59, the airlock outlet 71 tapers outwardly from the vertex 83 toward at least one sidewall 85, 87. In the illustrated embodiment, the outlet 71 tapers from the vertex 83 toward the first sidewall 85 and tapers from the vertex 83 toward the second sidewall 87 (i.e., proceeding in the direction of rotation of the vanes, the first portion of the outlet 71 is triangular in shape). The outlet 71 may taper toward the sidewalls 85, 87 in a straight path as shown or, as in other embodiments, in a curved path.

Figure 4:
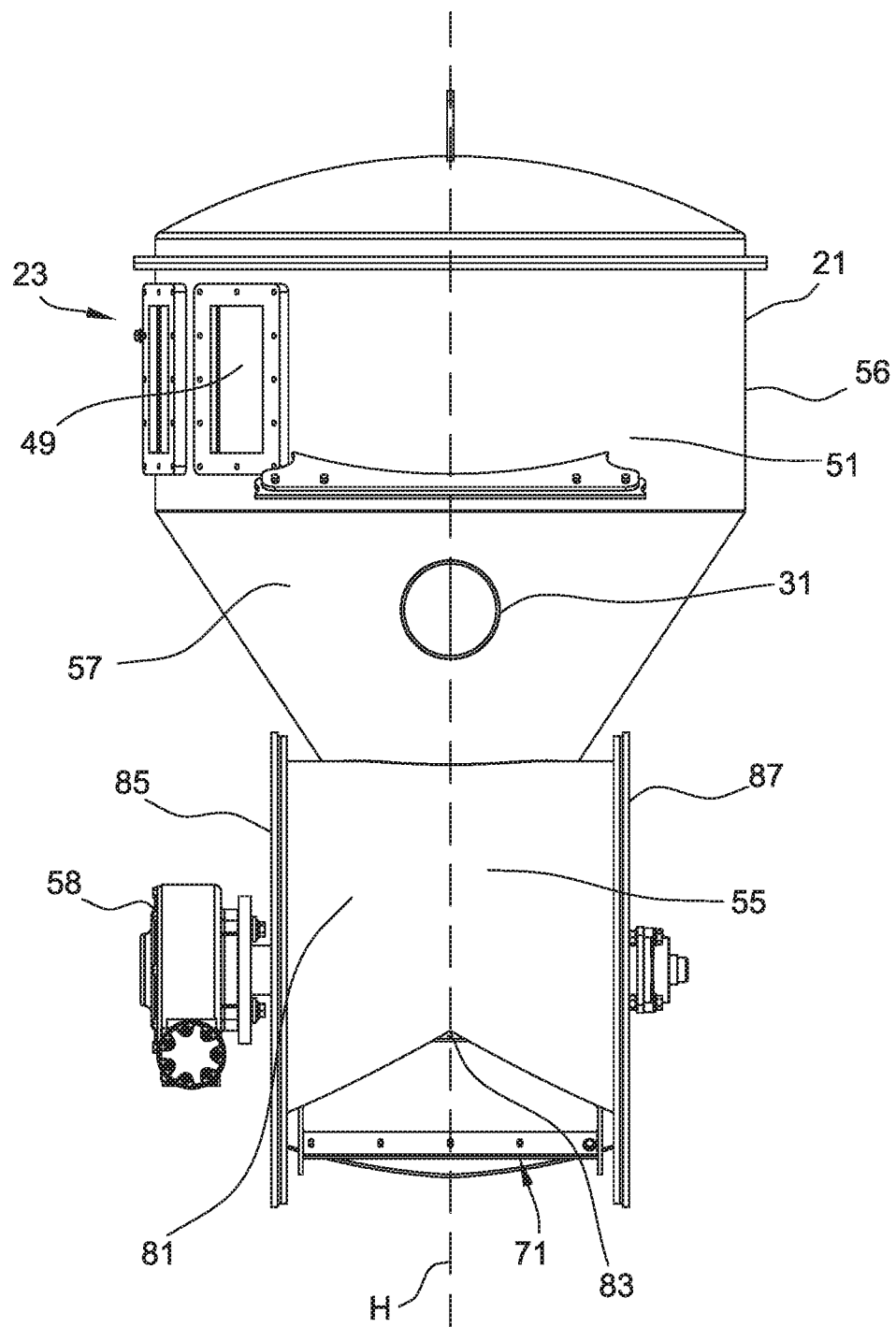
FIG. 4 is a front view of a separation vessel, shown as a deceleration vessel, and an airlock.
Figure 5:
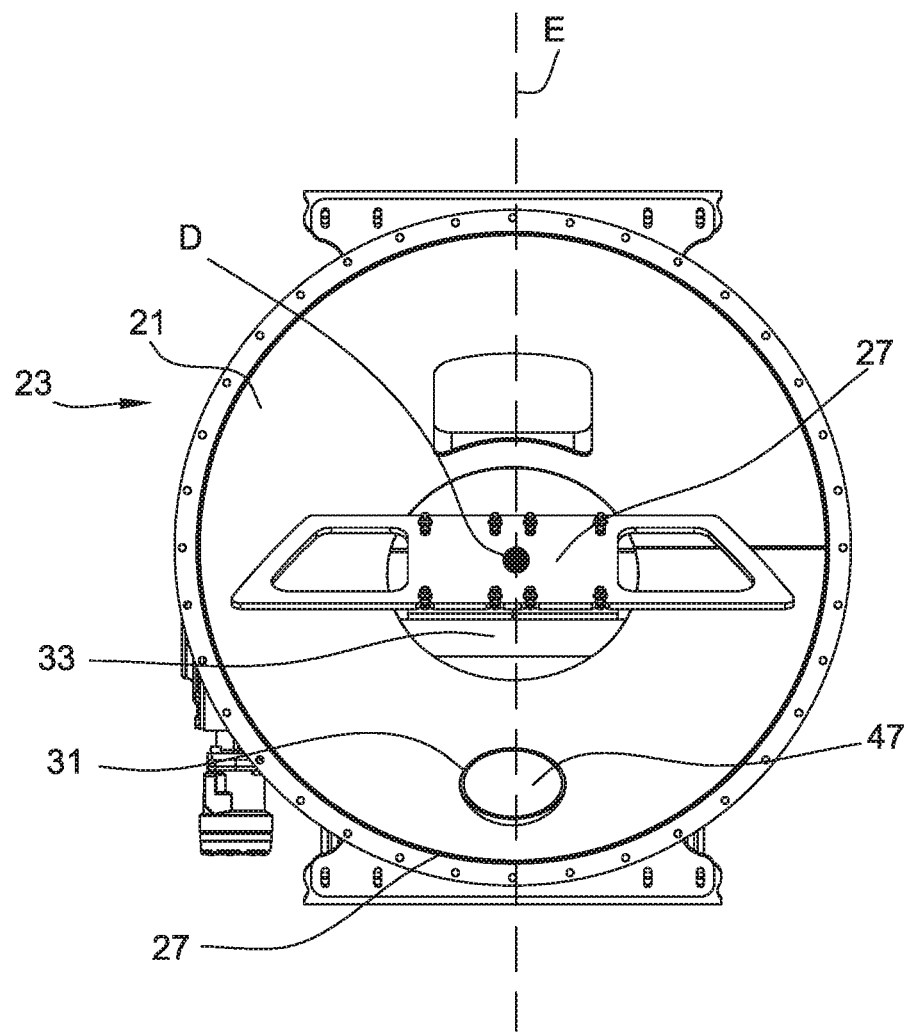
FIG. 5 is a top view of the deceleration vessel and a deflection plate.

As shown in FIG. 4, the outer annular wall 81 has a center plane H that is midway between the first and second sidewalls 85, 87. In the illustrated embodiment, the vertex 83 is at the center plane H.

Alternatively or in addition, the vanes 59 may taper to allow a small opening to be exposed to the ambient as the vanes rotate.

Two adjacent vanes 59 collectively form a pocket 89 (FIG. 6) which receives spoil material. The airlock 55 may also include pocket sidewalls 91 (FIG. 8A) that contact and rotate with the vanes 59. In other embodiments, the airlock 55 does not include pocket sidewalls 92.

In some embodiments, the airlock has less than about 15 vanes, less than about 10 vanes or about 8 vanes or less. In some embodiments, the vanes 59 rotate at a speed of less than about 15 RPM or less than about 10 RPM or even less than about 5 RPM.

Figure 8B:
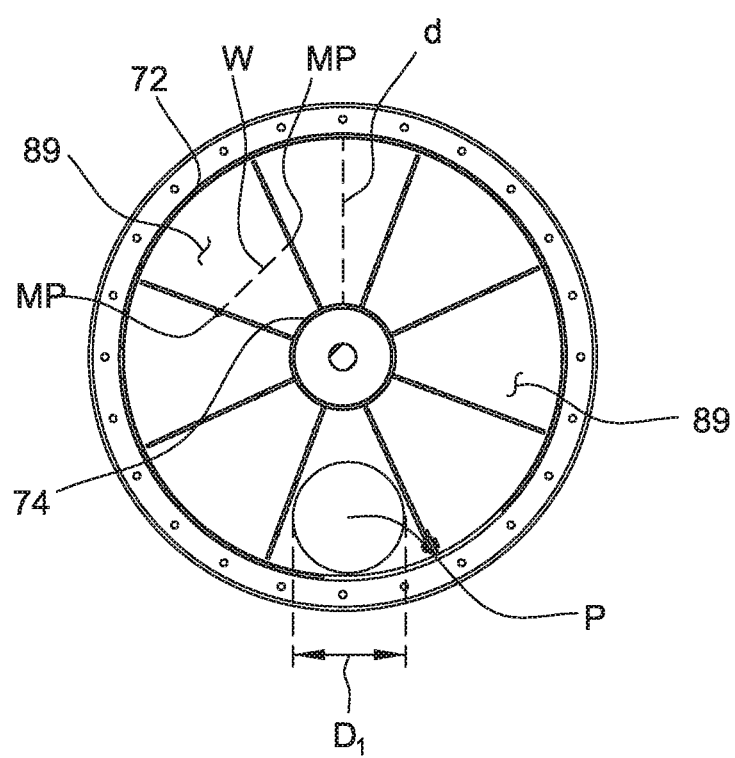
FIG. 8B is a cross-section side view of the airlock with a particle within a pocket thereof.

The number of vanes 59 and the diameter of the airlock 55 are selected in some embodiments so that the pocket 89 may accommodate the largest size of cut earthen material that may travel through the vacuum system 7 to the separation vessel 21. Generally, the largest material that could reach the airlock is material with a diameter equal to the diameter D1 of the conduits through which air and cut earthen material travel to the separation vessel 21. In some embodiments, the vanes 59 are sized to receive particles P with a diameter D1 (FIG. 8B) or greater. For example, in some embodiments, the vane pockets 89 may have a depth d of D1 or more. Alternatively or in addition, the pocket 89 may have width w of D1 or more at a mid-point MP of the pocket, the mid-point MP being midway between a top 72 and bottom 74 of the pocket 89.

Water and cut earth that exits the airlock 55 through the airlock outlet 71 (FIG. 8A) is introduced into the dewatering system 95 described further below (e.g., may be gravity fed to the dewatering system 95 as shown in the illustrated embodiments). In some embodiments, the water and cut earthen material is directly introduced into the dewatering system 95 (e.g., directly fed to a screening system without intermediate processing).

Dewatering System

The dewatering system 95 (FIG. 9) of some embodiments includes a pre-screen 101 that first engages material discharged from the outlet 71 of the airlock 55. In the illustrated embodiment, the pre-screen 101 has a plurality of slats 103 with openings formed between slats 103 through which material falls. The pre-screen 101 may have relatively large openings (e.g., at least about 0.5 inches, at least about 1 inch, at least about 1.5 inches, or 2 inches or more) such that relatively large material is prevented from passing through the pre-screen 101. The slats 103 have ribs 105 which reinforce the slats 103.

The pre-screen 101 may be adapted to withstand the impact of large stones and earthen material that are capable of being removed by the vacuum system 7 (FIG. 1). Example screens include screens that may be referred to by those of skill in the art as a "grizzly screener" or simply "grizzly." The pre-screen 101 may vibrate or, as in other embodiments, does not vibrate.

The dewatering system 95 of this embodiment includes a vibratory screen 109, more commonly referred to as a "shaker", that separates material that passes through the pre-screen 101 by size. The vibratory screen 109 has openings with a size smaller than the size of the openings of the pre-screen 101. In some embodiments, the size of the openings of the vibratory screen 109 are less than 250 micron, less than about 150 micron or less than about 100 micron. The ratio of the size of the openings of the pre-screen 101 to the size of the openings of the vibratory screen 109 may be at least about 100:1, at least about 250:1, or even at least about 500:1. The listed size of the openings and ratios thereof are exemplary and other ranges may be used unless stated otherwise.

The vibratory screen 109 may be part of a shaker assembly 113. The shaker assembly 113 includes vibratory motors 117 that cause the screen 109 to vibrate. The shaker assembly 113 may be configured to move the vibratory screen 109 linearly or in an elliptical path (e.g., by arranging the number of motors, orientation of the motors, and/or placement of the motors to move the vibratory screen 109 linearly or in an elliptical path).

The shaker assembly 113 rests on isolators 129 (shown as air bags) to isolate the vibratory movement of the assembly 113 from the chassis or frame to which it is connected. In some embodiments, the screen 109 is divided into multiple segments that can separately be changed out for maintenance.

As the screen 109 vibrates, effluent falls through openings within the screen 109 and particles that do not fit through the openings vibrate to the discharge end 121 of the assembly 113. Solids that reach the discharge end 121 fall into a hopper 125 (FIG. 1) and may be conveyed from the hopper 125 by a conveyor assembly 127 to form a stack of solids. Solids may be loaded into a bin, dumpster, loader bucket, ground pile, roll-off bin, dump truck or the like or may be conveyed to the site of the excavation as backfill. Solids may be transported off of the apparatus 3 by other methods.

In some embodiments, the apparatus 3 does not include a mixer for mixing spoil material (e.g., for mixing solids to promote drying or for mixing in drying agents).

Liquid that passes through the vibratory screen 109 collects in a catchpan 112 (FIG. 14) and is conveyed by a return water pump 110 to the fluid storage and supply system 25 described more fully below.

Figure 10:
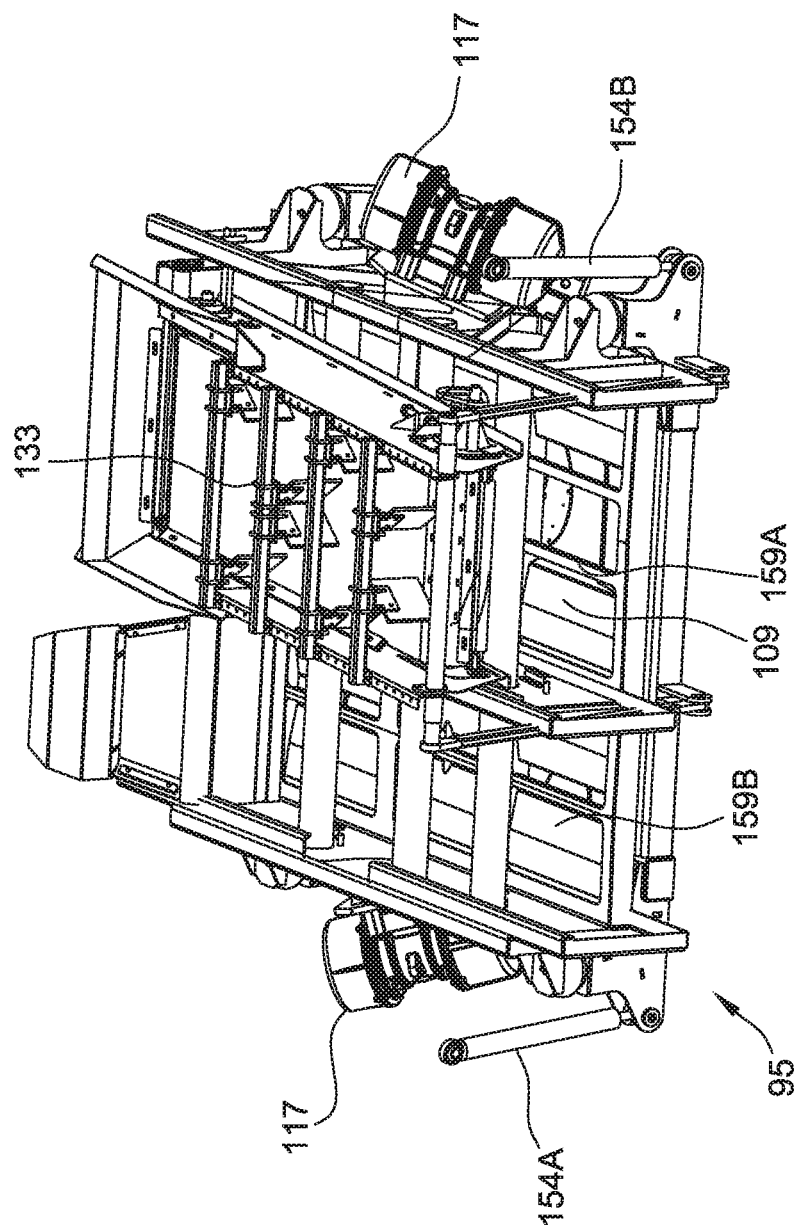
FIG. 10 is a perspective view of another embodiment of a dewatering system.

Another example dewatering system 95 is shown in FIG. 10. The dewatering system 95 includes a flat wire belt conveyor 133. Such flat wire belt conveyors 133 may include spaced wires or rods which form an open mesh in the belt that allow for liquids and particles that fit through the mesh openings to pass through the mesh. The flat wire belt conveyor 133 may remove larger solids and un-hydrated soil clumps which helps prevent downstream separation units from blinding (e.g., pluggage of mesh openings) and abrasive wear and damage. In various embodiments, the mesh size of the belt may be from about 0.25 cm to about 5 cm or from about 0.5 cm to about 3 cm.

Figure 11:
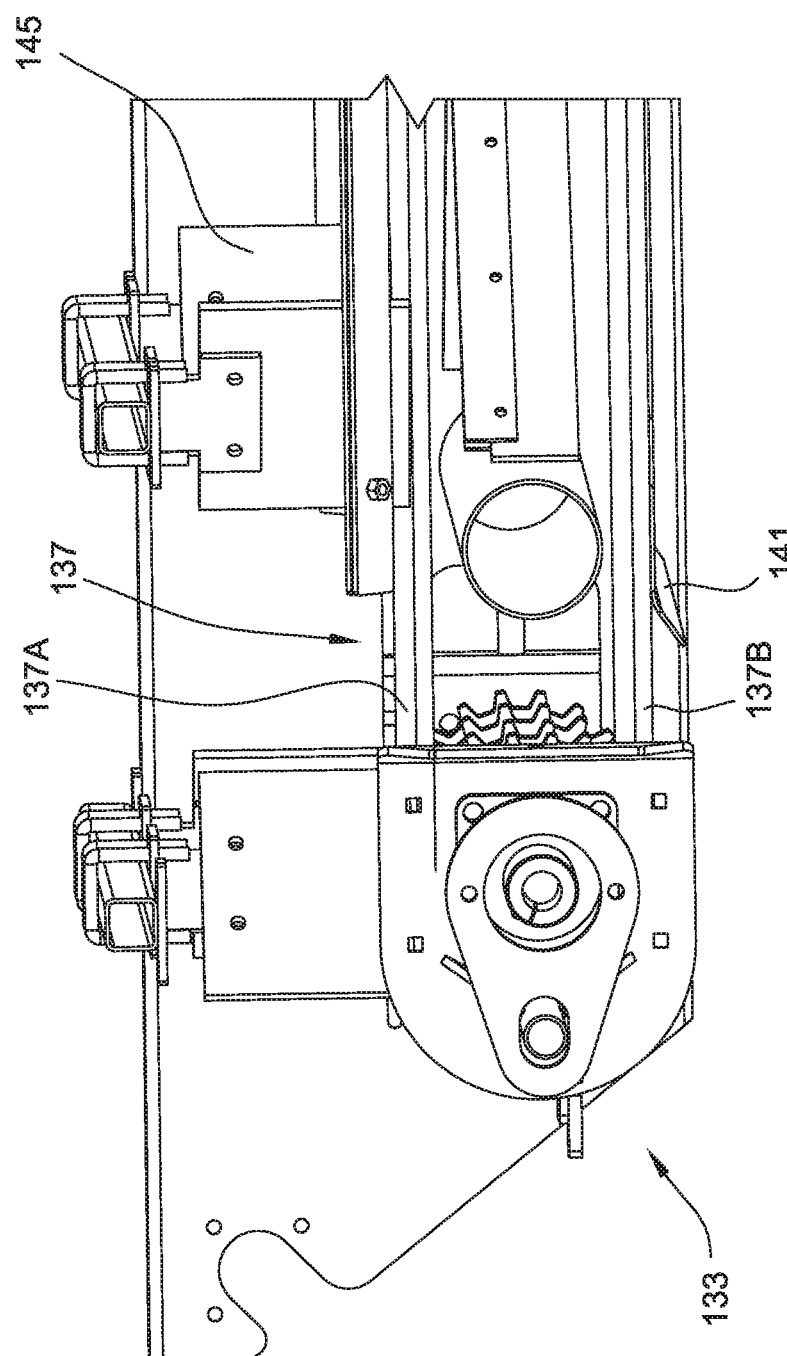
FIG. 11 is a cross-section side view of a flat wire belt conveyor of the dewatering system of FIG. 10.

The flat wire belt conveyor 133 angles upward toward the rear 18 (FIG. 1) of the apparatus 3 to promote separation of water from the cut earthen material. Liquid and small solids that pass through the mesh belt 137 (FIG. 11) fall through the top course 137A of the belt, land on the bottom course 137B of mesh (i.e., the return) and fall through the bottom course of mesh onto a conveyor floor or "chute" 141. The belt 137 may rest on the conveyor floor 141 and scrape material toward the liquid discharge end of the flat wire belt conveyor 133. Solids that do not pass through the openings are carried forward by the belt 137. While the belt 137 is shown of solid, unperforated material in the Figures for simplicity, it should be understood that, in this embodiment, the belt 137 includes mesh openings throughout the top course 137A and bottom course 137B. The flat wire belt conveyor 133 may include a series of deflectors 145 that act to turn or otherwise redirect solids that are moving forward on the conveyor 133. By turning the solids, additional fluid may fall through the conveyor 133 and be recovered as effluent.

The effluent that passes through the flat wire belt conveyor 133 is conveyed down the conveyor floor 141 and falls onto a shaker assembly 159 (FIG. 10) having a vibratory screen 109. The shaker assembly 159 may be configured similar to shaker assembly 113 described above and description herein of the shaker assembly 113 should be considered to apply to shaker assembly 159 unless stated otherwise. The shaker assembly 159 includes one or more vibratory screens 109 through which liquid and fine solids pass. The shaker assembly 159 includes a first side 159A which processes material that passes through and the flat wire belt conveyor 133 and a second side 159B which processes material separated by cyclones 11 (FIG. 2). The openings of the flat wire belt conveyor 133 are generally larger than the openings of the shaker assembly 159 such that the second shaker assembly 159 separates finer solids.

The dewatering system 95 of the present disclosure may include additional separation and/or purification steps for processing cut earthen material. In some embodiments, the cut earth is separated from water only by use of a (1) a first stage pre-screen or flat wire belt conveyor, and (2) a second stage vibratory screen. In these or in other embodiments, the screen (e.g., pre-screen 101 or flat wire belt conveyor 133) may receive spoil material directly from the separation vessel 21 without intermediate processing, i.e., without feeding the material to a hydrocyclone such as a desilter cone to separate water from earthen material. In some embodiments, water that passed through the screens may be fed directly to the water supply and storage system 25 (FIG. 1) described further below without being further processed (e.g., centrifugation). In some embodiments, the water recovered from the excavation site is not treated without additives (e.g., flocculants and/or coagulants).

Pitch and Roll Adjustment System

Figure 12:
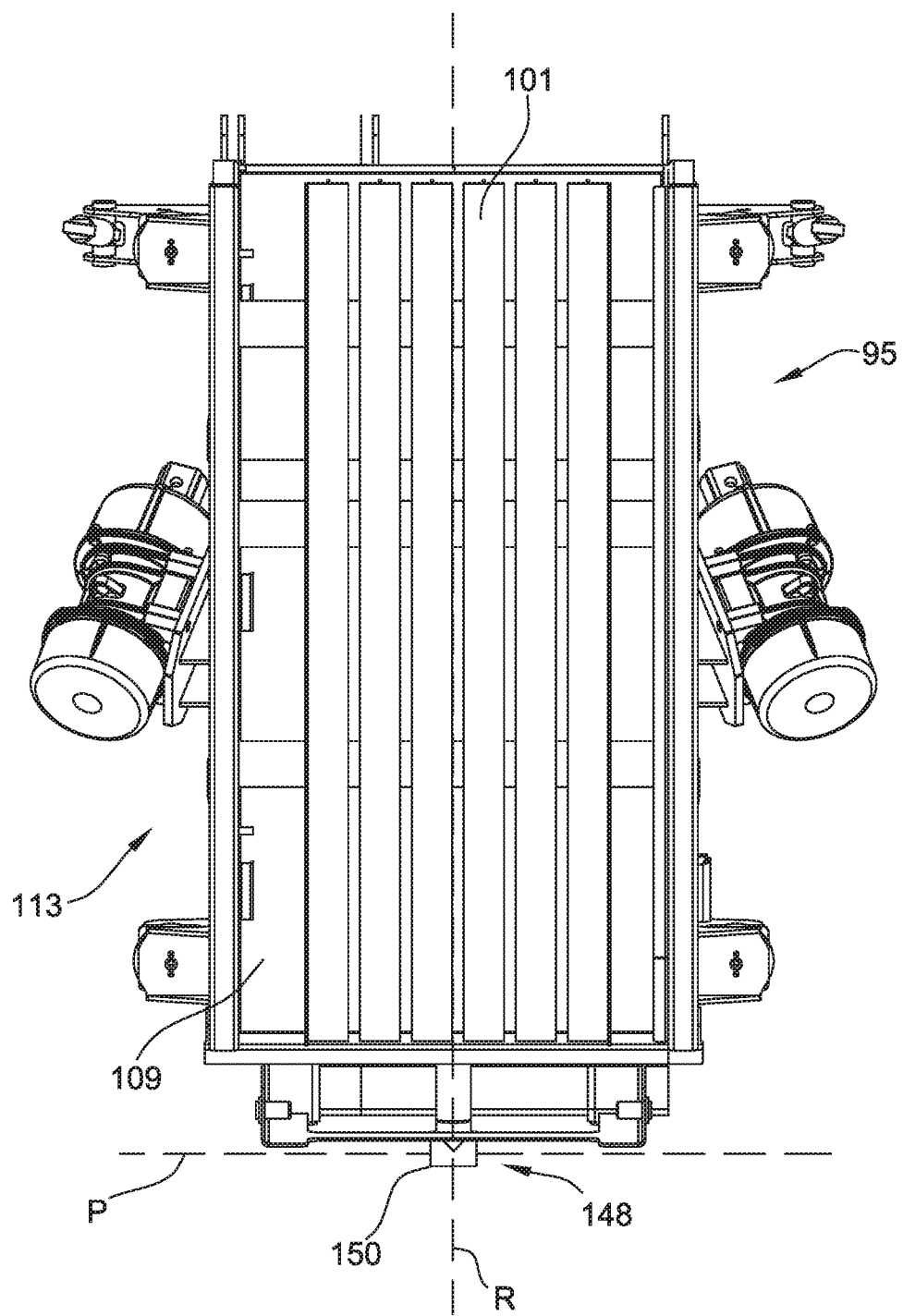
FIG. 12 is a top view of the dewatering system of FIG. 9.

The hydro excavation vacuum apparatus 3 may include an adjustment system 148 (FIG. 12) for adjusting a pitch and a roll of one or more screens of the dewatering system 95. The adjustment system 148 may generally be used to adjust any screen such as the pre-screen 101, vibratory screen 109 or flat wire belt conveyor 133 (FIG. 10) or to adjust combinations of these screens.

The adjustment system 148 includes a pivot member 150 for adjusting the pitch and the roll of the screen. The screens pivot about a pitch axis P (FIG. 12) and also pivot about a roll axis R. The pivot member 150 is pivotally connected to a bracket 155 (FIG. 15) which is connected to the chassis 14 of the apparatus 3. In the illustrated embodiment, a single pivot member 150 is shown. In other embodiments, two separate pivot members 150 are used.

Figure 13:
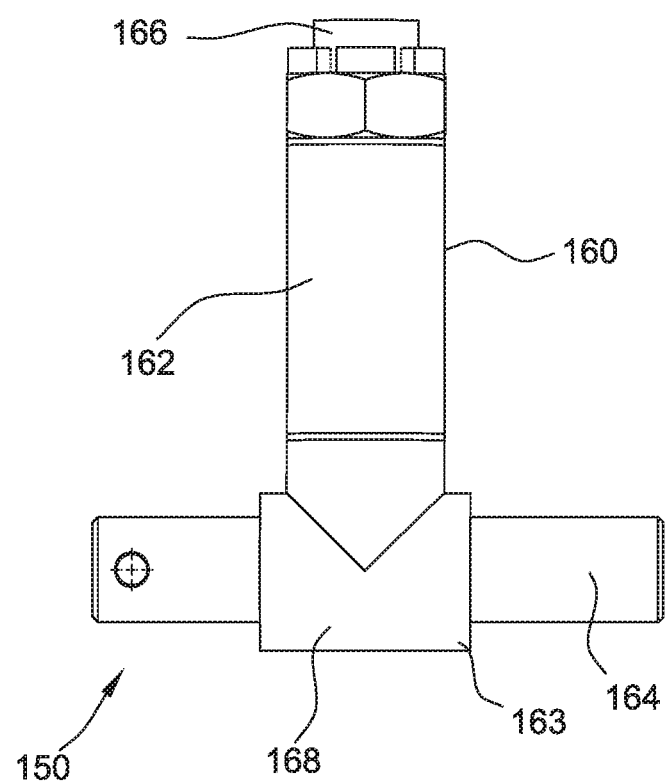
FIG. 13 is a top view of a pivot member for controlling the pitch and roll of a screen of the dewatering system.

Referring now to FIG. 13, the pivot member 150 includes a first portion 160 to adjust the roll of the screen and a second portion 163 that extends from the first portion 160 to adjust the pitch of the screen. The first portion 160 of the pivot member 150 is perpendicular to the second portion 163.

Figure 15:
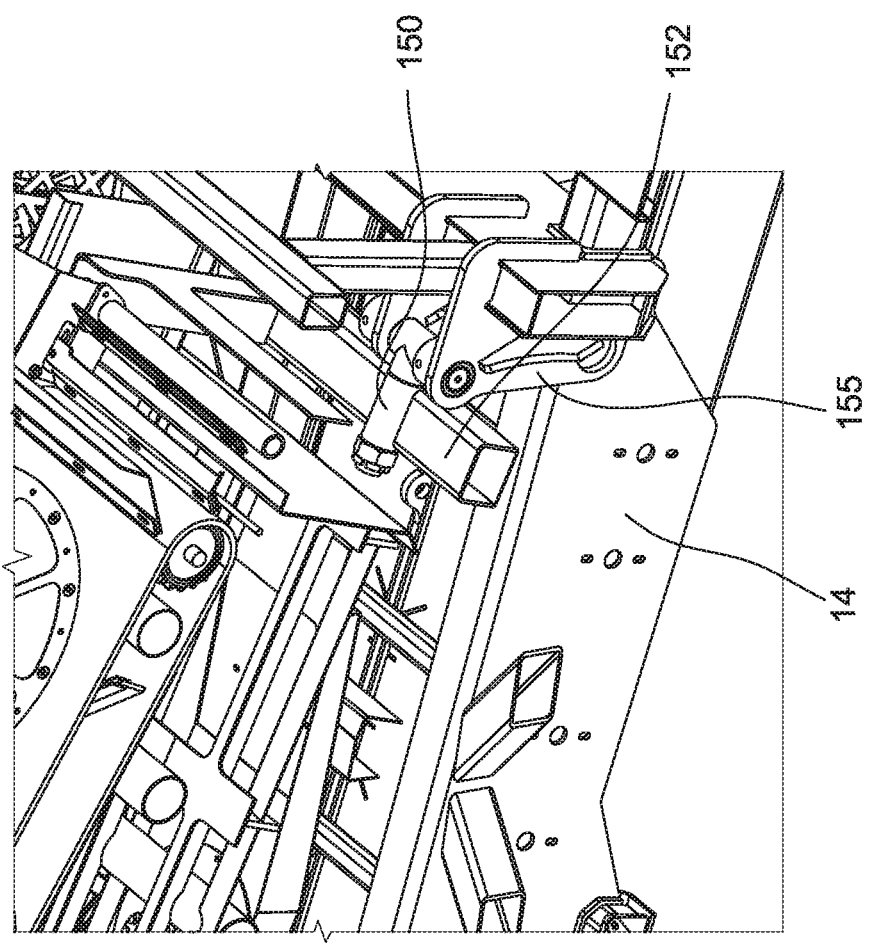
FIG. 15 is a detailed cross-section perspective view of the apparatus.

The pivot member 150 includes sleeves, bearings and/or bushings to allow the screen to pivot with respect to the remainder of the apparatus. In the illustrated embodiment, the first portion 160 contains a first portion sleeve 162 and a first shaft 166 that extends through the sleeve 162. The first portion sleeve 162 is attached to a frame 152 (FIG. 15) that supports the screens to allow the frame 152 and screens to pivot about the shaft 166 to adjust the roll of the screens. The second portion 163 includes a second portion sleeve 168. The first shaft 166 is attached to the second portion sleeve 168. A second shaft 164 extends through the second portion sleeve 168 and is connected to the bracket 155 (FIG. 15). The second sleeve 168 and the screens pivot about the shaft 164 to adjust the pitch of the screens. In other embodiments, each of the first and second portions 160, 163 may include a bushing or bearing such as a ball bearing or roller bearing.

Figure 16:
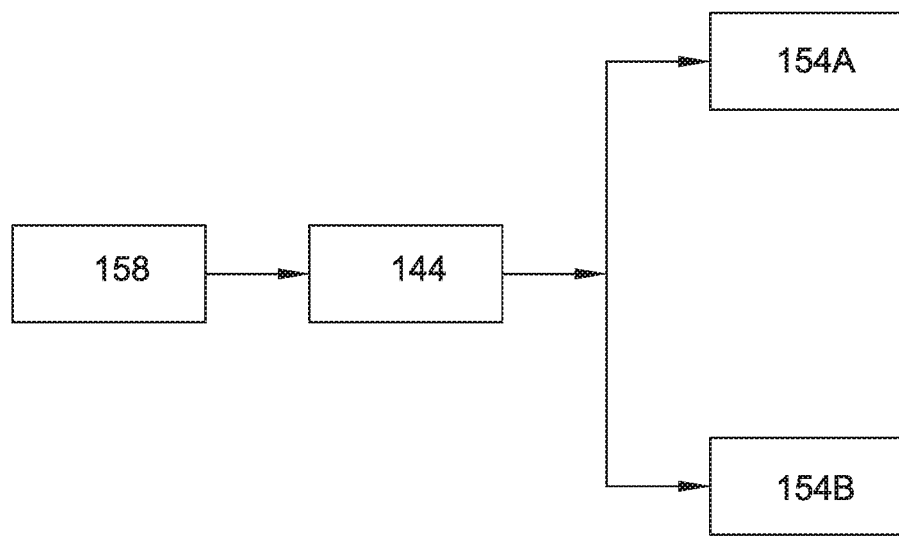
FIG. 16 is a block diagram of a system for controlling the pitch and roll of a screen of the dewatering system.

The adjustment system 148 includes a first actuator 154A (FIG. 9) and a second actuator 154B (shown as hydraulic cylinders) which work in cooperation with the pivot member 150 to adjust the pitch and roll of the vibratory screen 109. A sensor 158 (FIG. 16) senses the pitch and/or roll of the screen. In other embodiments, two separate sensors detect the pitch and roll, respectively. The sensor 158 produces a signal that is transmitted to a controller 144. The controller 144 may be the same controller 44 described below for controlling the flow of liquids in the fluid storage and supply system 25 (FIG. 1) or may be a separate controller 144 that includes similar components (e.g., contains processors, memory and the like as described below).

The controller 144 controls the actuators 154A, 154B based on input from the sensor 158. Generally, the controller 144 controls the actuators 154A, 154B to eliminate roll within the screen (i.e., the screen is laterally level). The controller 144 may control the actuators 154A, 154B to achieve a target pitch of the screen 109. For example, the screen 109 may be adjusted to have a positive pitch, negative pitch or to be level. The operator may select a pitch by a user interface (not shown) that is communicatively coupled to the controller 144.

Figure 17:
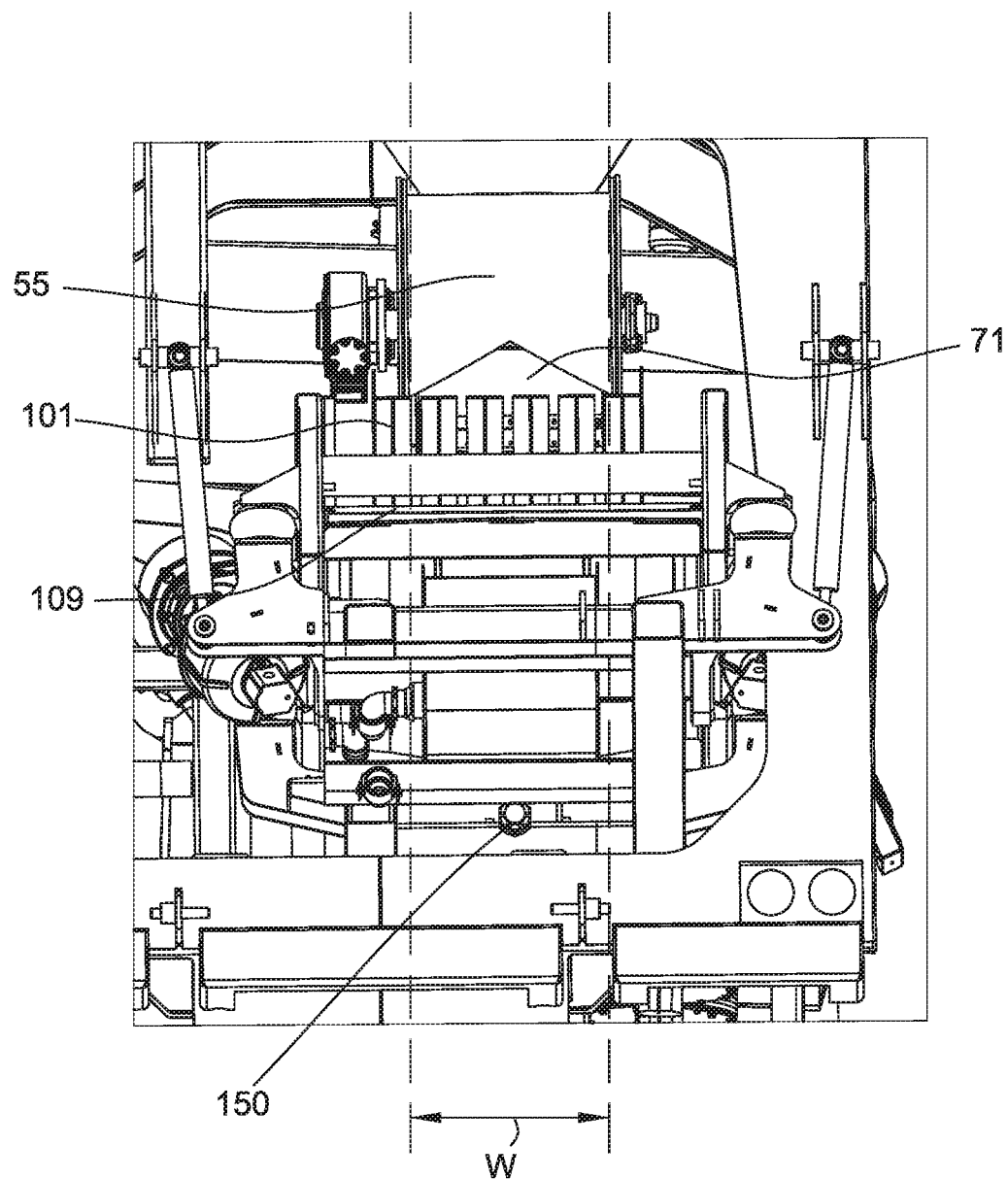
FIG. 17 is a detailed perspective view of the apparatus.

Referring now to FIG. 17, in some embodiments, the pivot member 150 is aligned with the outlet 71 of the airlock 55 relative to the lateral axis B (FIG. 3A) of the apparatus 3. The airlock outlet 71 has a width W and the pivot member 150 is laterally aligned with the width W of the outlet 71.

Figure 14:
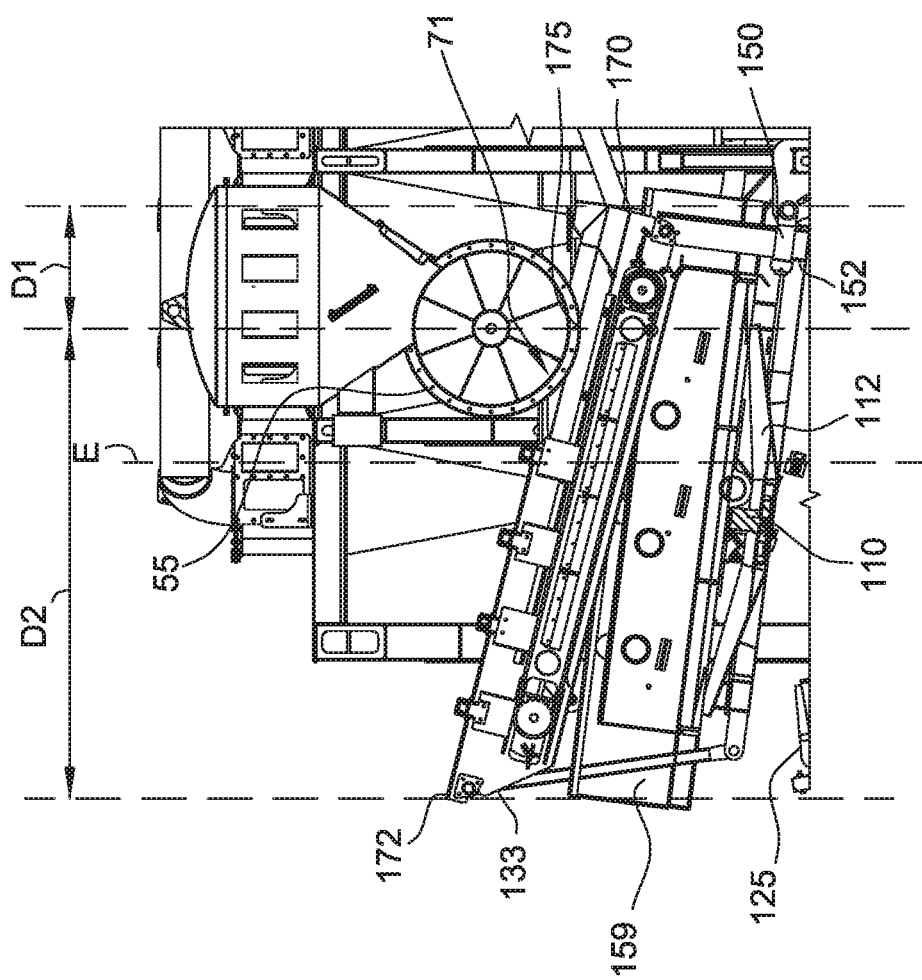
FIG. 14 is a detailed cross-section side view of the apparatus.

Alternatively or in addition, the pivot member 150 may be located relatively near the airlock 55 relative to the longitudinal axis A (FIG. 3A) such that the screen upon which material is loaded from the airlock 55 pivots a relatively small amount near the airlock 55 which allows the vertical profile of the apparatus to be reduced. Referring now to FIG. 14 in which a flat wire belt conveyor 133 is shown, the conveyor 133 has a rear 170 toward which material is loaded onto the belt from the airlock outlet 71 and a front 172 toward which material is discharged from the screen. A center plane E is midway between the rear 170 and the front 172. The pivot member 150 is rearward to the center plane E of the screen 133 relative to the longitudinal axis A (FIG. 3A) (i.e., the pivot member 150 is nearer the rear 170 than the front 172 of the screen).

The airlock 55 has a bottom 175. The bottom 175 of the airlock 55 and the rear 170 of the screen are separated by a distance D1 relative to the longitudinal axis A (FIG. 3A). The bottom 175 of the airlock 55 and the front 172 of the screen 133 are separated by a distance D2 relative to the longitudinal axis A. The distance D1 between the bottom 175 of the airlock 55 and the rear 170 of the screen 133 is less than the distance D2 between the bottom 175 of the airlock 55 and the front 172 of the screen 133.

The pivot member 150 of the illustrated embodiment allows two degrees of freedom (e.g., roll and pitch) in which to adjust the screen. In some embodiments, the apparatus 3 does not include a panhard rod to eliminate a third degree of freedom (e.g., yaw).

Fluid Storage and Supply System

The hydro excavation vacuum apparatus 3 includes a fluid storage and supply system 25 (FIG. 1) which supplies water for high pressure excavation and stores water recovered from the dewatering system 95. The fluid storage and supply system 25 includes a plurality of vessels 30 for holding fluid. In the illustrated embodiment, the vessels 30 are sections of a baffled tank 32 (FIG. 18) with the vessels 30 being separated by baffles 35. The tank baffles 35 generally extend from the bottom 40 to the top 42 of each vessel 30 such that fluid does not pass over the baffles 35 into adjacent vessels. In other embodiments, the vessels 30 are separate tanks. In some embodiments, water is not processed when transferred between tanks (e.g., further purification such as by centrifugation in hydrocyclones or by addition of additives such as flocculants or coagulants).

Figure 26:
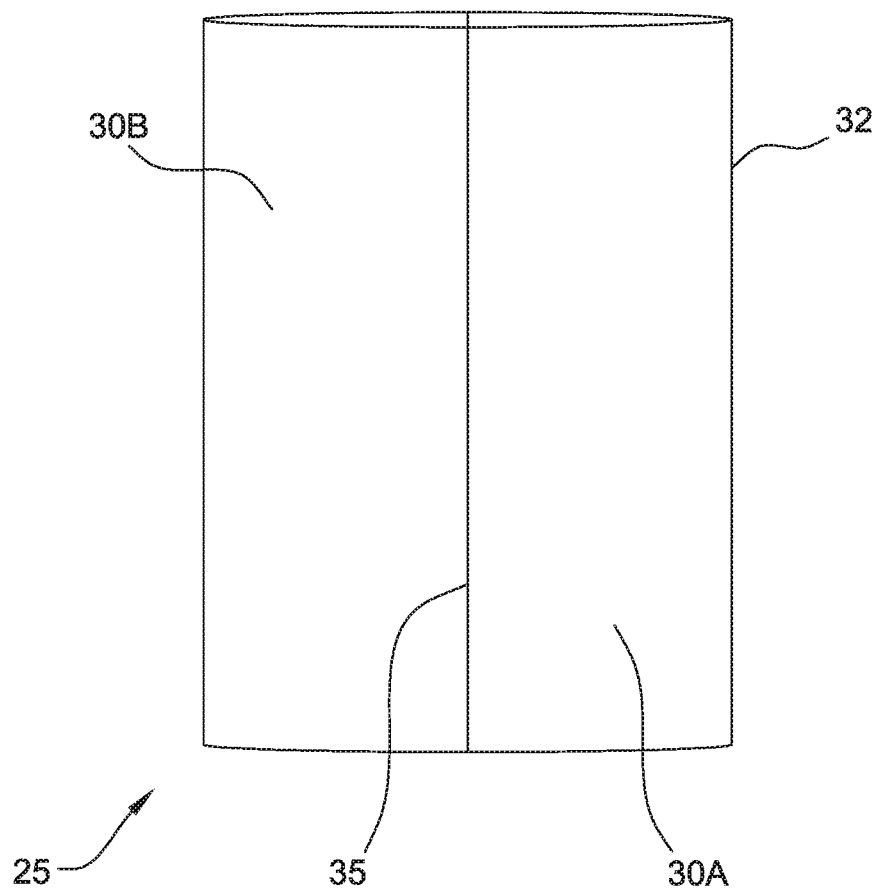
FIG. 26 is a schematic view of a two vessel fluid storage and supply system.
Figure 27:
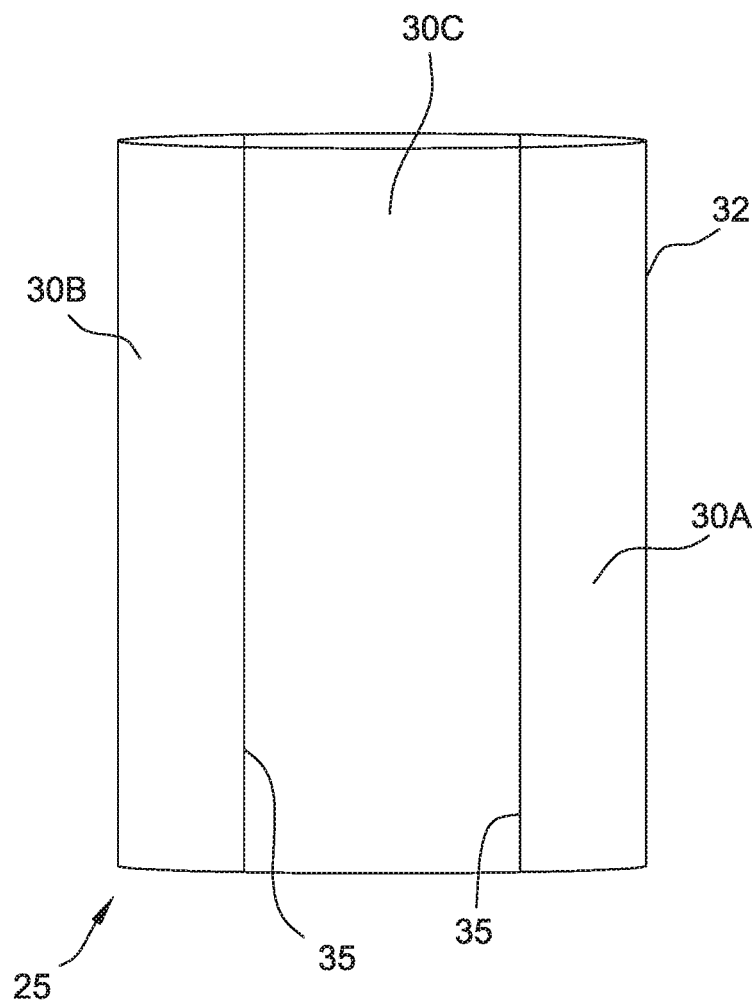
FIG. 27 is a schematic view of a three vessel fluid storage and supply system.

In the embodiment illustrated in FIGS. 18-25, the fluid storage and supply system 25 includes four vessels 30. In other embodiments, the system 25 may include two vessels 30 (FIG. 26), three vessels 30 (FIG. 27) or more than four vessels 30 (e.g., five, six or more vessels).

The fluid storage and supply system 25 carries fluid used for high pressure excavation. As excavation of a site begins, the hydro excavation vacuum apparatus 3 processes earth cuttings and reclaimed water from the excavation site with reclaimed water being stored in the fluid storage and supply system 25. The initial water used for excavation (i.e., water not having been processed through the dewatering system 95 of the apparatus 3) may be referred herein as "maiden water." Water that has been reclaimed from the excavation site and stored in the fluid storage and supply system 25 may be referred to herein as "first cycle water." In some embodiments, first cycle water may be used as the source of water for high pressure excavation. In such embodiments, the reclaimed water may be referred to as "second cycle water." Additional cycles may be performed to produce "third cycle water," "fourth cycle water," and so on. The fluid storage and supply system 25 is adapted to allow maiden water to remain separated from first cycle water without having dedicated empty tank space to reduce the volume of tanks carried on the apparatus 3.

Figure 18:
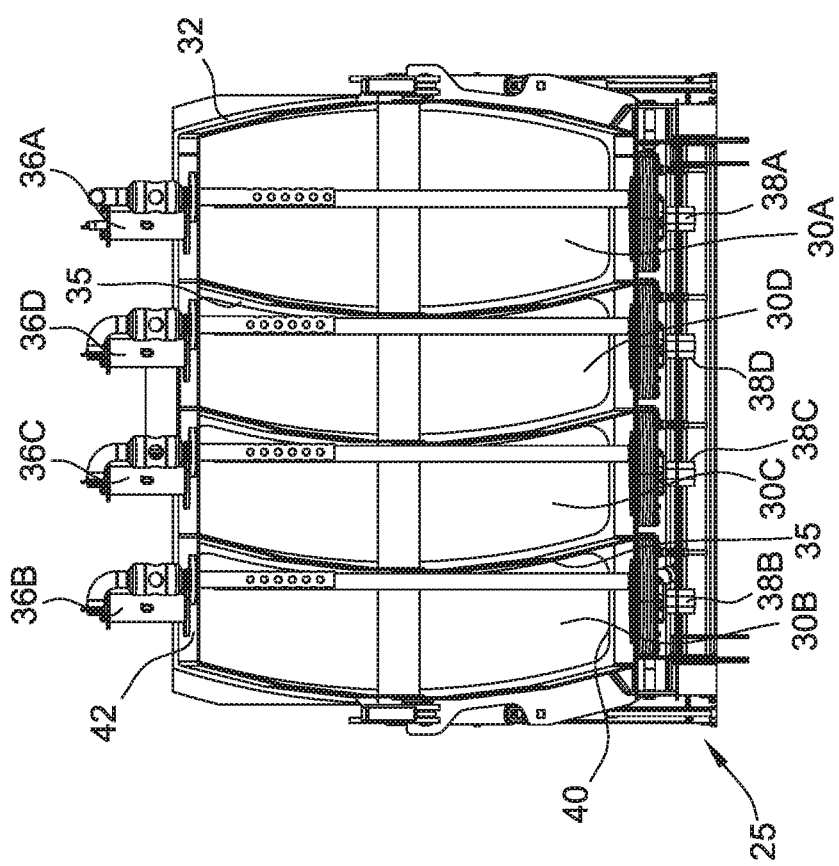
FIG. 18 is a side view of a fluid storage and supply system.

Referring now to FIG. 18, the fluid storage and supply system 25 includes a first vessel 30A. The first vessel 30A is in fluid communication with the excavation fluid pump 6 (FIG. 3B). The system 25 may include a first vessel pump 38A that may provide head pressure for the excavation fluid pump 6 or that may be used to empty out the first vessel 30A.

In other embodiments, the first vessel pump 38A is eliminated. The fluid storage and supply system 25 also includes a second vessel 30B that is in fluid communication with the dewatering system 95 to receive first cycle water discharged from the dewatering system 95. A return water pump 110 (FIG. 14) conveys first cycle water from the catchpan 112 of the dewatering system 95 to the second vessel 30B. The return water pump 110 may operate upon activation of a float or may run continually to move first cycle water to the second vessel 30B.

A first vessel level sensor 36A measures the level of fluid in the first vessel 30A and a second vessel level sensor 36B measures the level of fluid in the second vessel 30B. A second vessel transfer pump 38B pumps fluid from the second vessel 30B (e.g., to the first vessel 30A as in two vessel embodiments or to a third vessel as in embodiments having three or more vessels).

As shown in FIG. 18, in some embodiments, the system 25 includes a third vessel 30C or even a fourth vessel 30D. The third vessel 30C is in fluid communication with the second vessel 30B. The second vessel transfer pump 38B transfers fluid from the second vessel 30B into the third vessel 30C. A third vessel transfer pump 38C transfers fluid to the first vessel 30A or, in embodiments in which the system 25 includes a fourth vessel, to the fourth vessel 30D. A third vessel level sensor 36C senses the fluid level in the third vessel 30C.

In embodiments in which the fluid storage and supply system 25 includes a fourth vessel 30D, the fourth vessel 30D is in fluid communication with the third vessel 30C. A fourth vessel level sensor 36D senses the fluid level in the fourth vessel 30D. A fourth vessel transfer pump 38D transfers fluid from the fourth vessel 30D to the first vessel 30A.

The level sensors 36A, 36B, 36C, 36D may be ultrasonic sensors, radar sensors, capacitance sensors, float sensors, laser sensors or the like.

The vessels 30 of the fluid storage and supply system 25 may be separate compartments of a single tank as shown in FIGS. 18-27 or may be separate tanks or may be a combination of compartmentalized tanks and separate tanks.

Cycling of water within the fluid storage and supply system 25 is illustrated in FIGS. 19-25. While cycling of water in the system 25 may be described and shown with reference to four vessels 30, the description is also applicable to two or three vessel systems unless stated differently.

Figure 19:
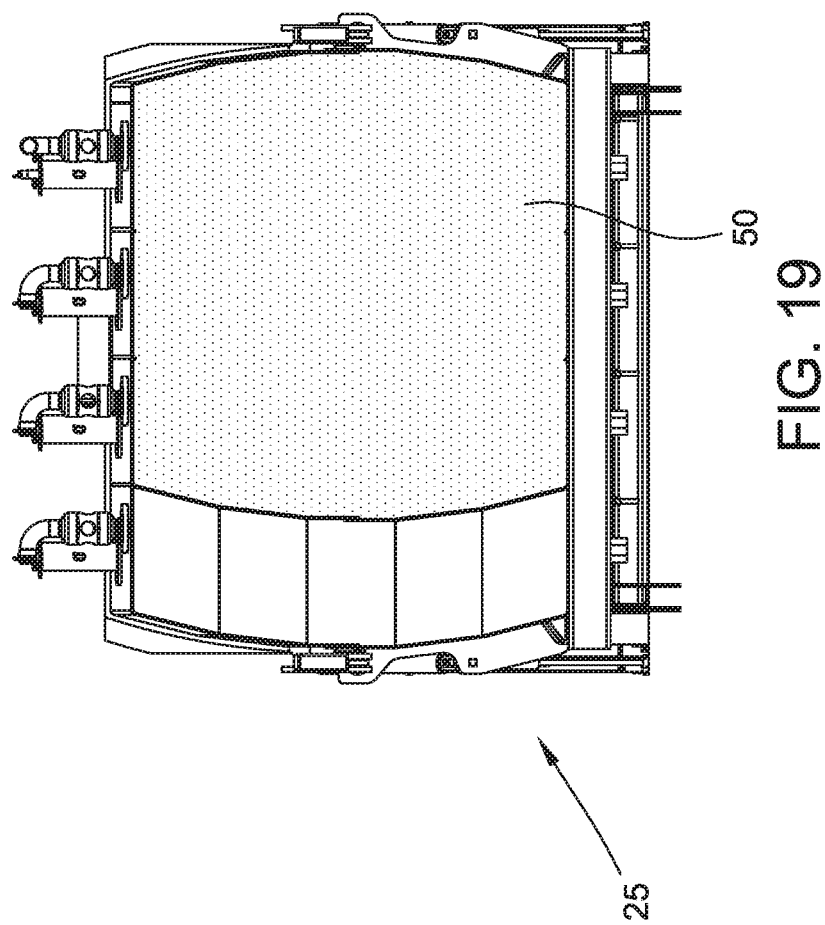
FIG. 19 is a side view of the fluid storage and supply system with three vessels full of maiden water.

To perform an excavation, the first vessel 30A and, if equipped and as in the embodiment of FIG. 19, the third vessel 30C, and fourth vessel 30D, are filled with maiden water 50, indicated by stippling. The source of maiden water may be potable water, surface water (e.g., pond, river, ditch water) or grey water substantially fee of abrasive grit. After filling, the maiden water 50 in the first vessel 30A has an initial level. The hydro vacuum excavating apparatus 3 is then transported from the site at which the vessels are filed with maiden water to a second site at which a high-pressure water excavation is performed. During excavation of a site, the excavation fluid pump 6 (FIG. 3B) directs high-pressure maiden water through the wand 4 (FIG. 3C). During excavation, the vacuum system 7 (FIG. 1) causes spoil material to become entrained in an airstream and pass through the boom 9 and other conduits and into the separation vessel 21. Spoil material is separated from the airstream by the separation vessel 21 and cyclones 11. The spoil material is introduced into the dewatering system 95 through airlock 55 and/or pumped from the cyclone discharge pump 20. The first cycle water is separated from spoil material in the dewatering system 95. The separated first cycle water is directed to the second vessel 30B. Solids discharged from the dewatering system 95 falls into a hopper 125 (FIG. 1) and are conveyed from the hopper 125 by a conveyor assembly 127 to form a stack of solids.

Figure 20:
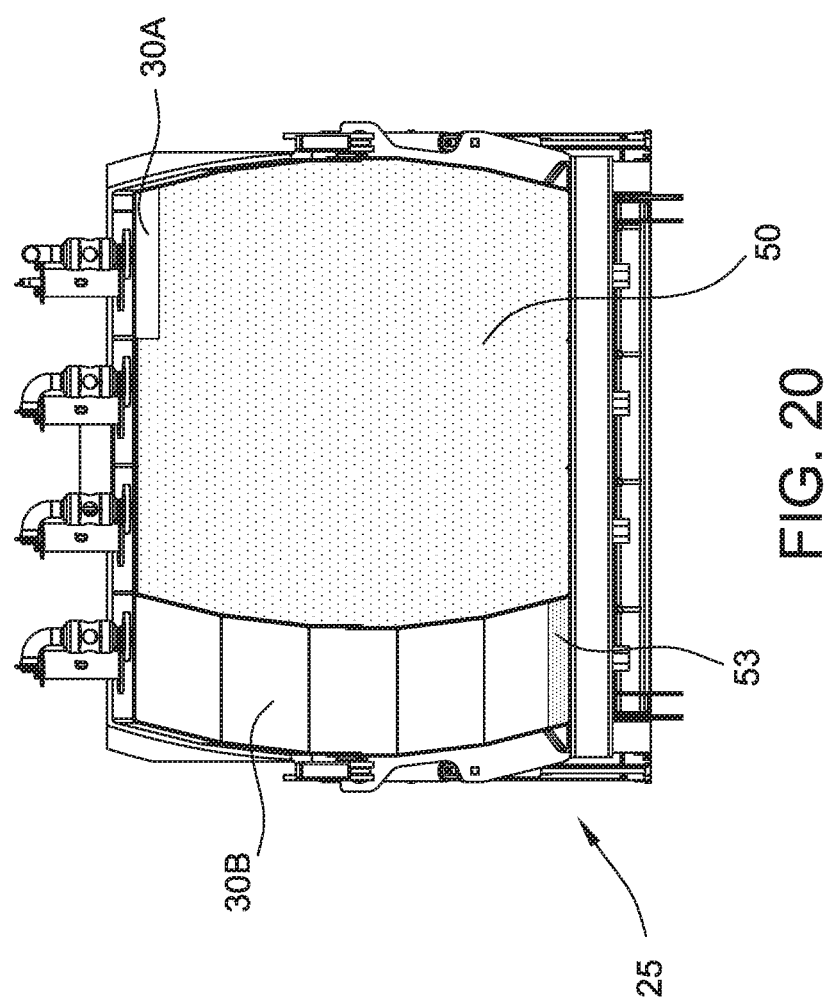
FIG. 20 is a side view of the fluid storage and supply system after excavation has commenced.

As excavation commences, maiden water 50 is drawn from the first vessel 30A causing the level of fluid in the first vessel 30A to be reduced below the initial level (FIG. 20). The first vessel level sensor 36A senses the reduction in the fluid level in the first vessel 30A. Once the level of maiden water in the first vessel 30A is reduced to below the initial level or is even reduced further (e.g., reduced to a level of about 99% of the initial level or less, about 95% or less, about 90% or less, about 50% or less, about 25% or less, about 10% less or when the first vessel 30A is emptied of maiden water 50), additional maiden water 50 is transferred to the first vessel 30A. For example, maiden water may be pumped from the fourth vessel 30D into the first vessel 30A to maintain a level of fluid in the first vessel 30A for excavation. In embodiments in which the system 25 includes three vessels (FIG. 27), maiden water may be pumped from the third vessel 30C into the first vessel 30A.

In this manner, additional maiden water may be directed toward the excavation site after the volume of the maiden water used for excavation is at least the volume of the first vessel 30A (i.e., additional excavation may be performed after the volume of maiden water in the first vessel 30A is consumed). Water may be transferred within the system 25 as excavation is being performed and the dewatering system 95 operates.

Figure 21:
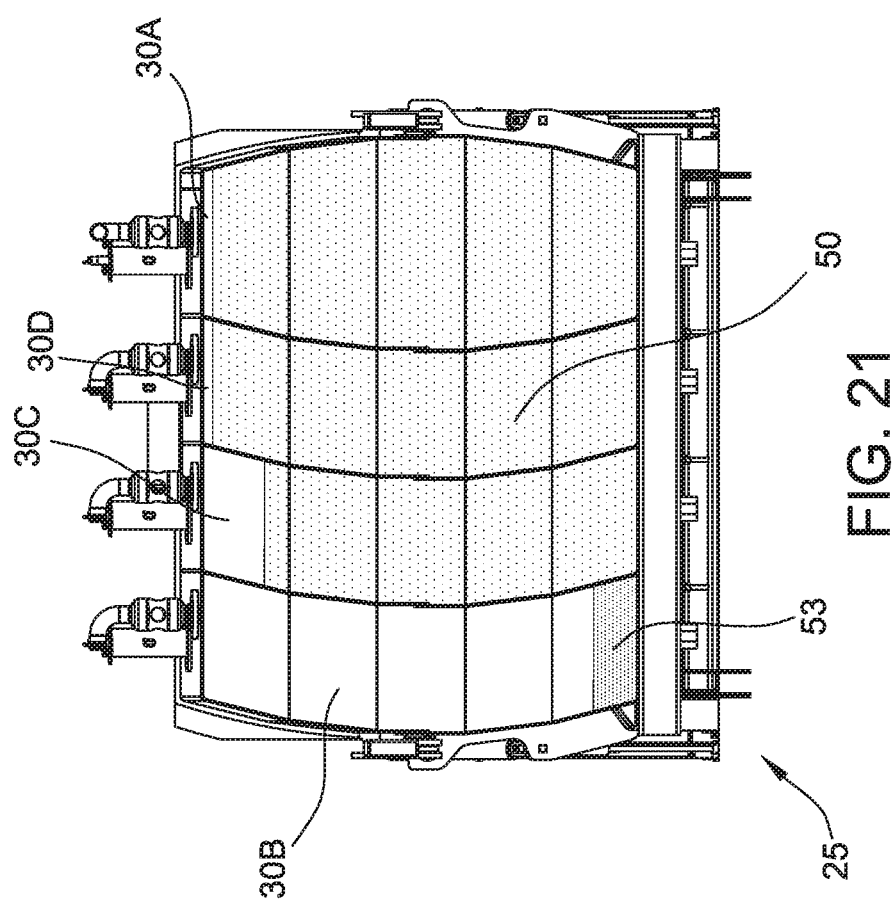
FIG. 21 is a side view of the fluid storage and supply system with an amount of maiden water transferred from the third vessel and fourth vessel.
Figure 22:
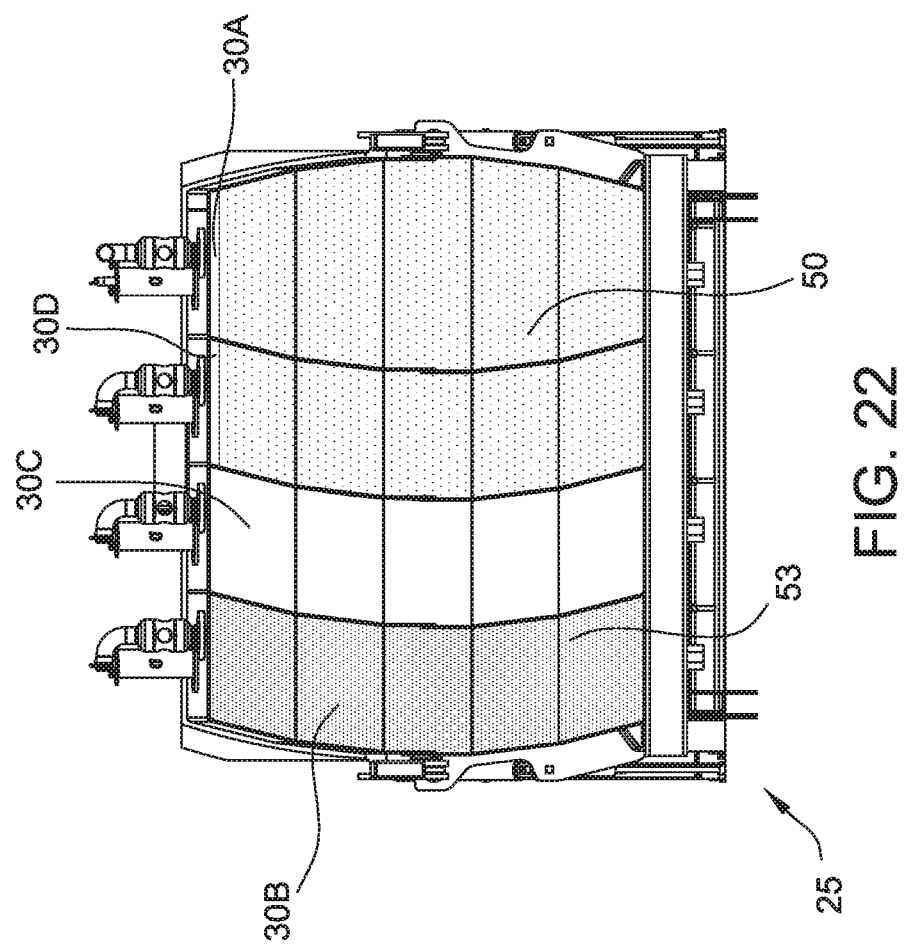
FIG. 22 is a side view of the fluid storage and supply system with the third vessel emptied of maiden water.

As maiden water 50 is transferred from the fourth vessel 30D into the first vessel 30A, the level of fluid in the fourth vessel 30D is reduced. As the level of fluid in the fourth vessel 30D is reduced to below the initial level or less (e.g., to a level of about 99% of the initial level or less, or about 95% or less, about 90% or less, about 50% or less, about 25% or less, about 10% less or when the fourth vessel is emptied of maiden water), maiden water from the third vessel 30C is transferred to the fourth vessel 30D (FIG. 21).

Figure 23:
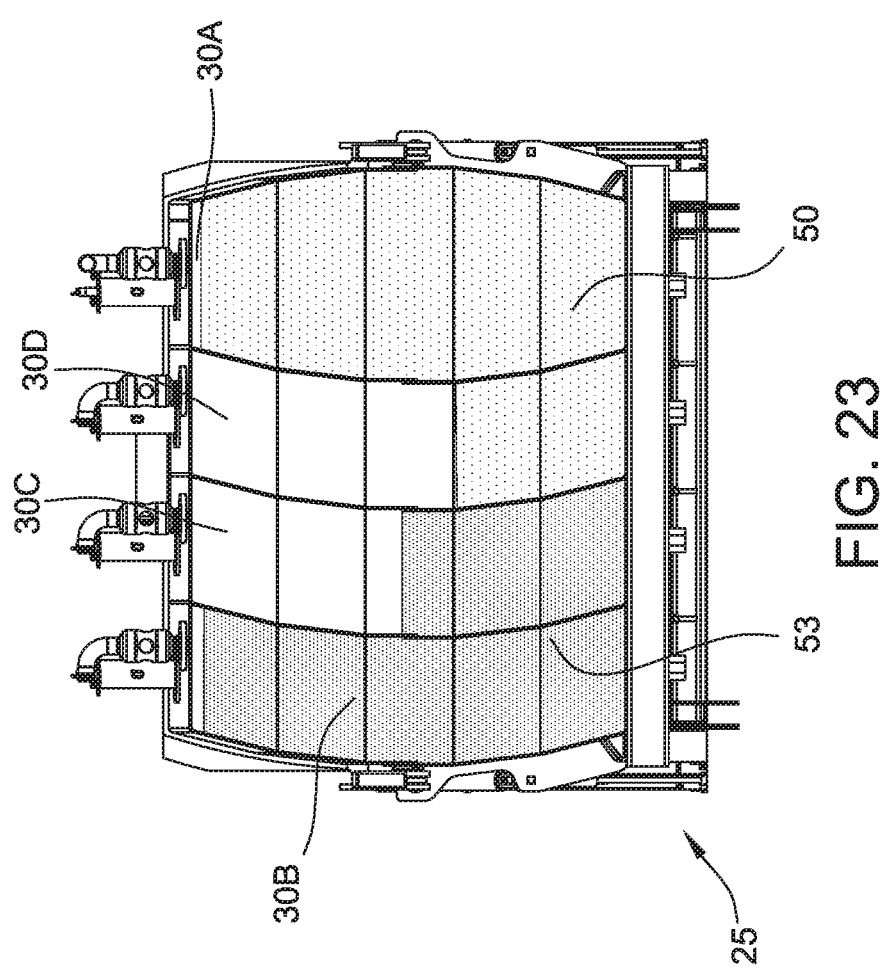
FIG. 23 is a side view of the fluid storage and supply system with first cycle water transferred from the second vessel to the third vessel.
Figure 24:
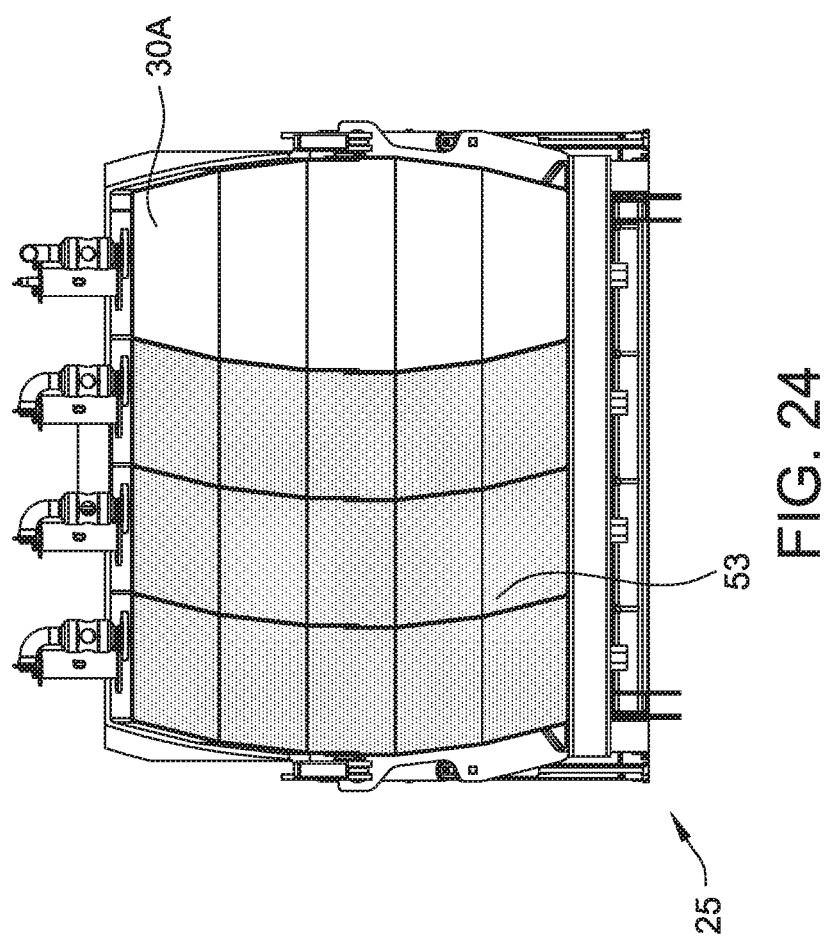
FIG. 24 is a side view of the fluid storage and supply system with first cycle water being transferred from the third vessel into the fourth vessel.

During excavation, the empty second vessel 30B begins to fill with first cycle water 53, shown with heavier stippling in FIG. 20. The second vessel 30B continues to fill with first cycle water 53 (FIG. 22) as excavation continues. After the third vessel 30C is emptied of maiden water (FIG. 22), first cycle water 53 is transferred from the second vessel 30B into the third vessel 30C (FIG. 23). Once the fourth vessel 30D is emptied of maiden water 50, first cycle water 53 from the third vessel 30C may be pumped to the fourth vessel 30D (FIG. 24).

Figure 25:
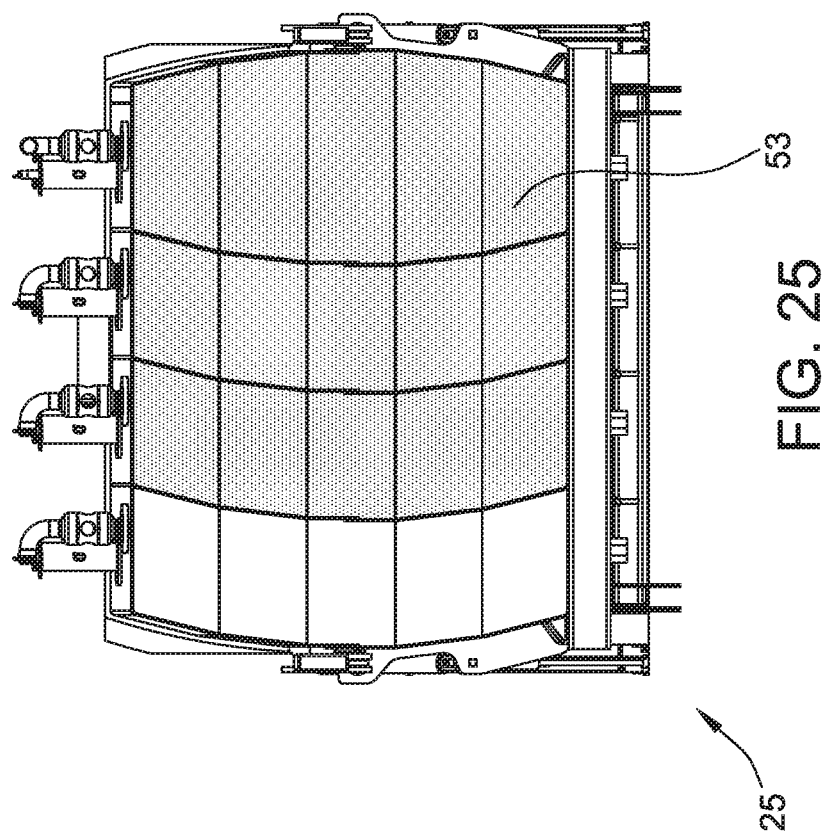
FIG. 25 is a side view of the fluid storage and supply system with the second, third, and fourth vessels filled with first cycle water.

After the maiden water in the fluid storage and supply system 25 is consumed, first cycle water may be used for excavation. The first cycle water 53 may be transferred into the first vessel 30A (FIG. 25). The excavation fluid pump 5 (FIG. 3B) directs pressurized first cycle water 53 from the first vessel 30A toward an excavation site to cut earthen material. The cut earth and first cycle water (now second cycle water) are removed from the excavation site. The second cycle water is separated from the cut earthen material in the dewatering system 95 (FIG. 1) with the second cycle water being introduced into the second vessel 30B. As excavation continues, the second cycle water is subsequently introduced into the third vessel 30C, fourth vessel 30D, and/or first vessel 30A. After first cycle water is consumed, the second cycle water may be used for excavation by transferring second cycle water into the first vessel 30A. The excavation fluid pump 6 directs pressurized second cycle water from the first vessel 30A toward an excavation site. Additional cycles may be performed to re-use reclaimed water and reduce the frequency at which maiden water is loaded onto the apparatus.

In some embodiments, the fluid processed through the dewatering system 95 (e.g., first cycle water, second cycle water, etc.) and stored in the fluid storage and supply system 25 is monitored to determine if the fluid is suitable for use for excavation. The fluid may be monitored manually or automatically. The fluid may be monitored by measuring clarity, translucence, conductivity, viscosity, specific gravity, or the like. Fluid that is unsuitable for excavation may be disposed (e.g., municipal water treatment) or may be treated in a separate reclamation system (e.g., with coagulant or flocculant treatment). An example reclamation system is disclosed in U.S. Provisional Patent Application No. 62/444, 567, filed Jan. 10, 2017, entitled "Systems and Methods for Dosing Slurries to Remove Suspended Solids," which is incorporated herein by reference for all relevant and consistent purposes.

Figure 38:
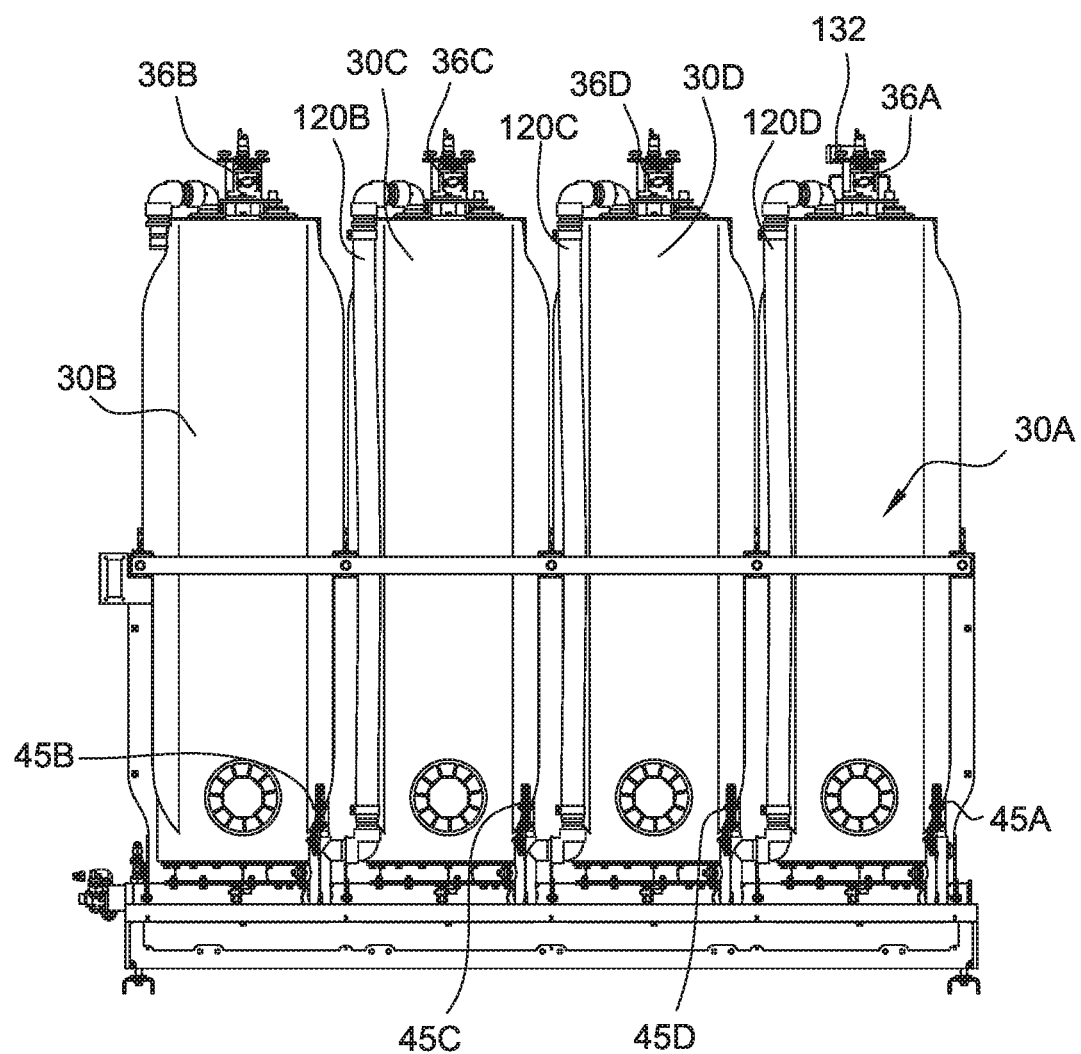
FIG. 38 is another embodiment of a fluid storage and supply system.
Figure 39:
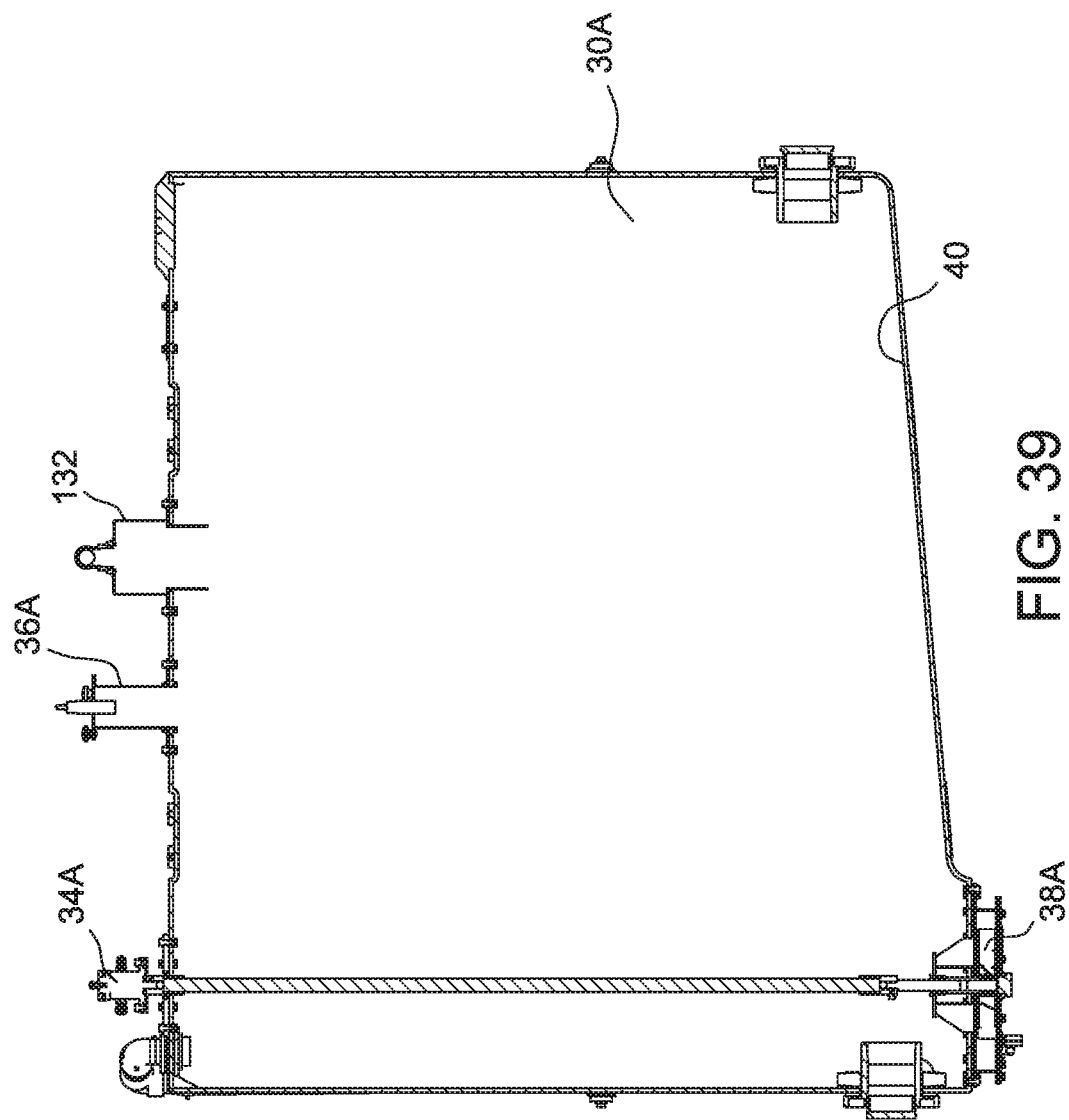
FIG. 39 is a cross-section of a vessel of the fluid storage and supply system.
Figure 40:
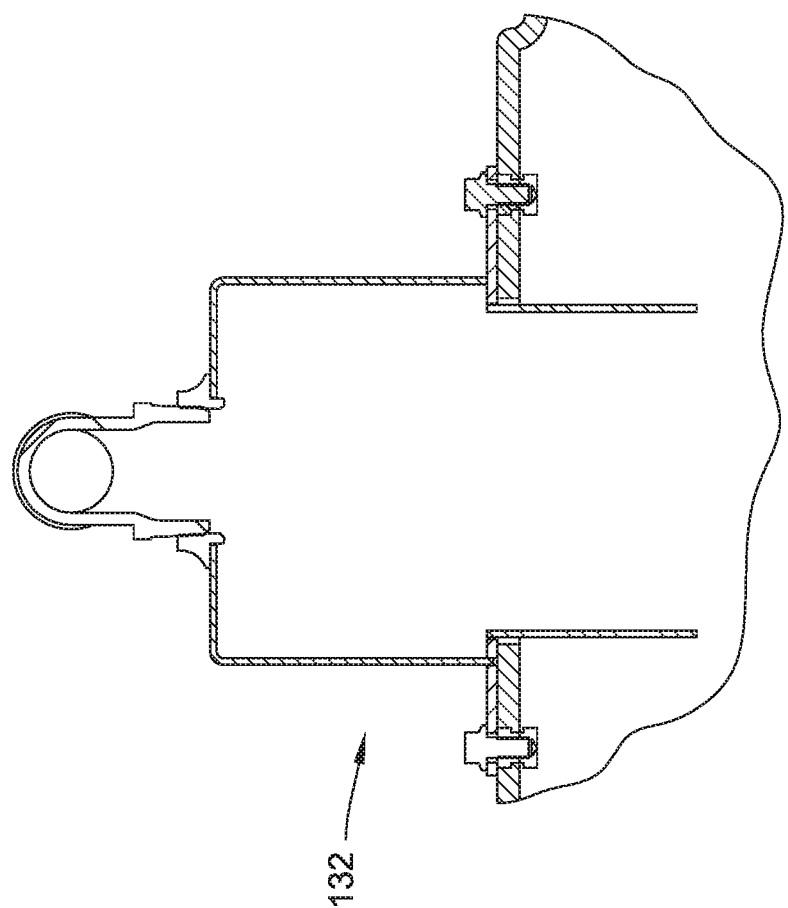
FIG. 40 is a cross-section of an airgap device.

Another embodiment of the fluid storage and supply system 25 is shown in FIGS. 38 and 39. The system 25 generally includes the components of the system described above with several differences being described below. As shown in FIG. 39, the drive motor 34 of each pump 38 (first motor 34A and first vessel pump 38A being shown in FIG. 39) is disposed above the vessel 30A. The bottom 40 of each vessel 30 angles downward toward the pump 38 to allow the vessels to be more fully emptied. At least one of the vessels 30 such as the first vessel 30A (FIG. 39) includes an airgap device 132 as shown in FIG. 40 to prevent siphoning and cross-contamination through the transfer pipes 120.

Figure 41:
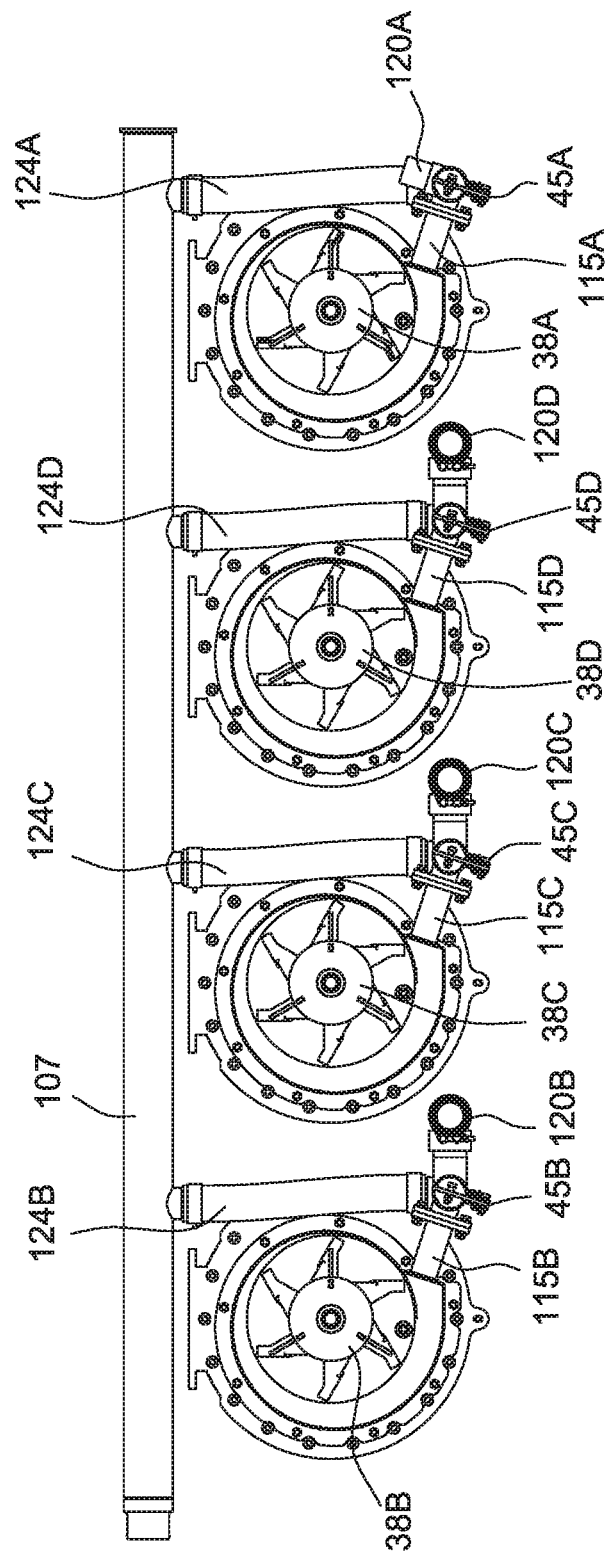
FIG. 41 is a bottom view of the fluid storage and supply system.

Referring now to FIG. 41, the system 25 includes a discharge manifold 107 for offloading water from the system 25 (e.g., recycled water such as first cycle water, second cycle water or the like). The system 25 includes valves 45A, 45B, 45C, 45D that are actuated to selectively move water within the system. During excavation and during recovery of water from the earthen slurry, the first valve 45A is positioned to direct maiden water discharged from the first vessel pump 38A to the excavation pump 6 (FIG. 3B). The second, third, and fourth valves 45B, 45C, 45D are positioned to direct water (e.g., maiden water or recycled water depending on how much maiden water and recycled water is in the system) to the next vessel in the system 25. To drain any of the vessels 30A, 30B, 30C, 30D with water, the corresponding valve 45A, 45B, 45C, 45D may be positioned such that water drains into the discharge manifold 107. The discharge manifold 107 includes an outlet through which water may exit the system 25.

In some embodiments, the discharge manifold 107 may be used while filling the system 25 with maiden water. For example, maiden water is directed into the first vessel 30A (FIG. 38) through airgap device 132. The first pump 38A is operated and the valve 45A is positioned to direct maiden water from the first vessel 30A to the discharge manifold 107 (FIG. 41). The outlet of the discharge manifold is closed such that the manifold 107 fills with water. The third and fourth vales 45C, 45D are positioned to allow maiden water to flow from the manifold 107, through pumps 38C, 38D (i.e., pumps 38C, 38C are off and water is caused to back-flow through pumps 38C, 38D). In this manner the first, third and fourth vessels 30A, 30C, 30D can be filled with maiden water. The second valve 45B is positioned such that the second tank 30B is not in fluid communication with the manifold 107 to allow the second tank 30B to remain empty to receive first cycle water. The system 25 may be automated by controlling the first pump 38A to cause the first, third and fourth vessels 30A, 30C, 30D to be at or near the same level during filling (e.g., by use of level sensors 36A, 36C, 36D).

Referring now to FIG. 42, each valve 45 includes a plunger 111. In the lowered position, the plunger 111 directs fluid that is received from the transfer pump in transfer pump conduit 115 to the transfer pipe 120 that is in fluid communication with the next vessel in the system 25 or with the excavation pump 6 (FIG. 3B). In the raised position of the plunger 111, fluid is directed from the transfer pump conduit 115 to the discharge conduit 124 which is connected to the discharge manifold 107 (FIG. 40) (or flows in the reverse direction such that maiden water flows from the manifold 107 to the tanks 30C, 30D such as when filling the system 24 with maiden water). In the illustrated embodiment, the valve 45 is actuated by hand by lever 130. In other embodiments, actuation of each valve 45 is automated.

Figure 28:
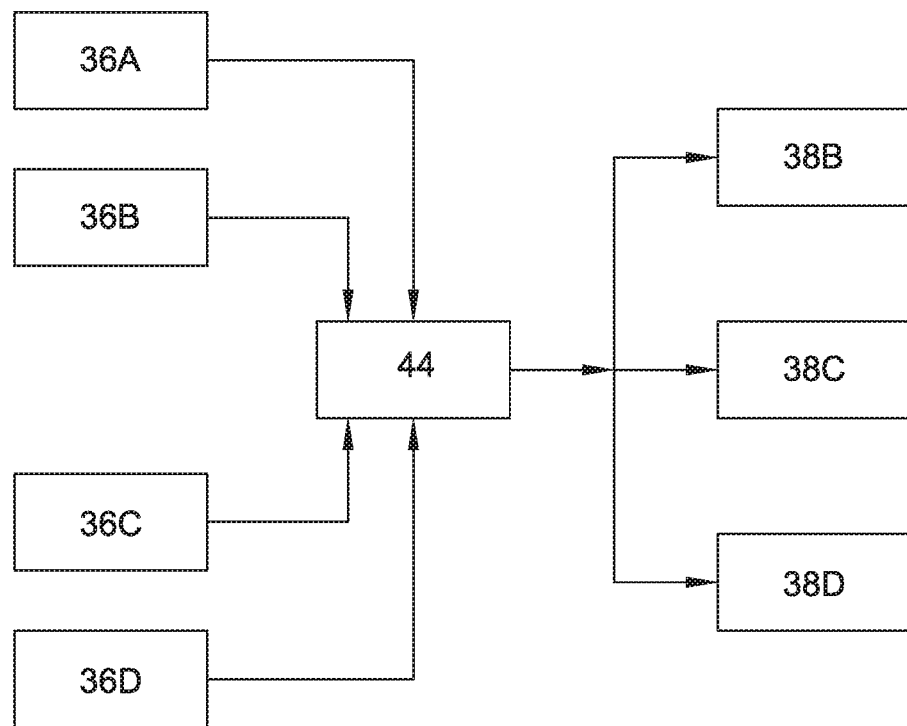
FIG. 28 is a block diagram of a system for controlling the transfer of fluid in the fluid storage and supply system.

In some embodiments, the fluid storage and supply system 25 includes a controller 44 (FIG. 28) that enables the second vessel transfer pump 38B, third vessel transfer pump 38C, and/or the fourth vessel transfer pump 38D to operate based at least in part on an output signal from the first vessel level sensor 36A, second vessel level sensor 36B, third vessel level sensor 36C, and/or fourth vessel level sensor 36D.

The controller 44 is communicatively coupled to the second vessel transfer pump 38B, third vessel transfer pump 38C, and the fourth vessel transfer pump 38D. The controller 44 selectively powers the pumps 38B, 38C, 38D to move maiden water and first cycle water within the vessels 30A, 30B, 30C, 30D as discussed further herein. The controller 44 may also be communicatively or operatively coupled to the first vessel pump 38A (e.g., to operate the pump 38A when the excavation pump 6 is operating or to unload all fluid from the first vessel 30A).

The controller 44 may control the pumps 38B, 38C, 38D based on instructions stored in a memory device (not shown), input received from sensors 36A, 36B, 36C, 36D, input from a user via a user interface, and/or input received from any other suitable data source.

Controller 44, the various logical blocks, modules, and circuits described herein may be implemented or performed with a general purpose computer, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Example general purpose processors include, but are not limited to only including, microprocessors, conventional processors, controllers, microcontrollers, state machines, or a combination of computing devices.

Controller 44 includes a processor, e.g., a central processing unit (CPU) of a computer for executing instructions. Instructions may be stored in a memory area, for example. Processor may include one or more processing units, e.g., in a multi-core configuration, for executing instructions. The instructions may be executed within a variety of different operating systems on the controller, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language e.g., and without limitation, C, C#, C++, Java, or other suitable programming languages, etc.

Processor may also be operatively coupled to a storage device. Storage device is any computer-operated hardware suitable for storing and/or retrieving data. In some embodiments, storage device is integrated in controller. In other embodiments, storage device is external to controller and is similar to database. For example, controller may include one or more hard disk drives as storage device. In other embodiments, storage device is external to controller. For example, storage device may include multiple storage units such as hard disks or solid state disks in a redundant array of inexpensive disks (RAID) configuration. Storage device may include a storage area network (SAN) and/or a network attached storage (NAS) system.

In some embodiments, processor is operatively coupled to storage device via a storage interface. Storage interface is any component capable of providing processor with access to storage device. Storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor with access to storage device.

Memory area may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 29:
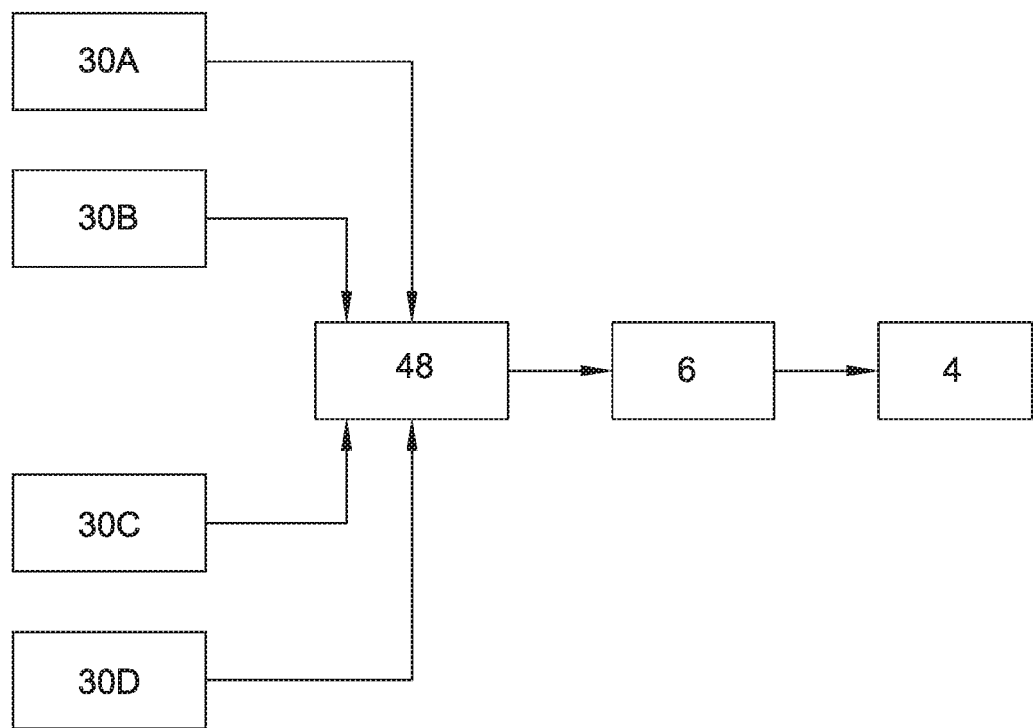
FIG. 29 is a block diagram of a valving system for controlling the transfer of fluid in the fluid storage and supply system.
Figure 30:
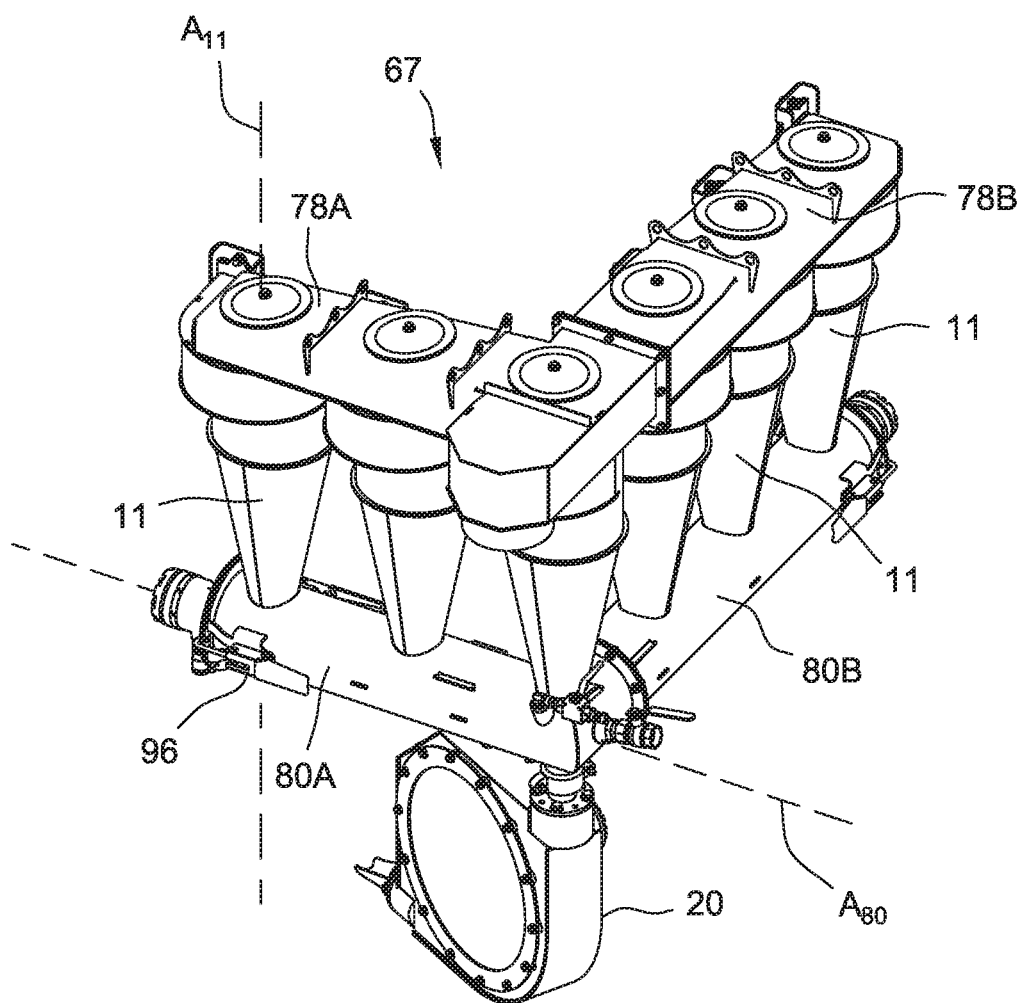
FIG. 30 is a perspective view of a cyclonic separation system.

In some embodiments, the fluid storage and supply system 25 includes a valving system 48 (FIG. 29) for switching the source of water used for high pressure excavation from vessel to vessel. The valving system 48 allows one of the first vessel 30A, 30B, 30C, 30D to be in fluid communication with the fluid excavation pump 6 and wand 4. In this manner, additional maiden pressurized water may be directed toward the excavation site after the volume of the maiden pressurized water used for excavation is at least the volume of the first vessel 30A (i.e., additional excavation may be performed after the volume of maiden water in the first vessel 30A is consumed). The valving system 48 may include hand-operated valves for switching the source of water used for excavation or the system 48 may include a controller (not shown) which controls the valving system 48 based on, at least in part, a signal from at least one of the first vessel level sensor 36A, the second vessel level sensor 36B, the third vessel level sensor 36C, and the fourth vessel level sensor 36D.

Alternatively or in addition, a valving system (not shown) may be used to select which vessel 30A, 30B, 30C, 30D is filled with first cycle water (i.e., a valving system disposed between the dewatering system 95 and the fluid storage and supply system 25). Alternatively or in addition, a valving system (not shown) may be used to transfer fluid between vessels 30A, 30B, 30C, 30D.

In some embodiments of the present disclosure, the hydro excavation vacuum apparatus is a mobile apparatus capable of recycling the water used for excavation such that the apparatus may be used to excavate one or more sites during daily use (e.g., for 8, 10 or 12 or more hours) without re-filling with maiden water and/or disposing of reclaimed water. The apparatus 3 may include vessels that are filled with maiden water before excavation begins with relatively little empty tank space (e.g., with 1250 gallon, 1500 gallon, 1750 gallon or more maiden water carrying capacity). The system may generate a vacuum of at least 18" Hg at 3000 standard cubic feet per minute. The dwell time of air passing through the separation vessel 21 may be less than about 5 seconds. A vibratory screen used to separate solids may have openings of 250 microns or less.

Compared to conventional apparatus for hydro vacuum excavating a site, the apparatus of the present disclosure has several advantages. The system may be adapted to process larger solids such as solids generated when a rotary wand is used to excavate a site (e.g., solids with a nominal diameter up to the size of the vacuum system conduits such as up to 6"). The system may include a deceleration system having a deceleration vessel and deflection plate which allows solids to be quickly directed toward the airlock. The deceleration vessel allows a large volume of air and cut earth and water to be processed in a relatively compact vessel which reduces the footprint of the separation vessels to be reduced. The deceleration vessel may be more compact than a cyclone in which materials are vortexed as the cyclone should have a sufficiently large spoil material outlet to let larger solids to pass but typically only operate efficiently within a small range of length to diameter ratios. In some embodiments, a single deceleration vessel may be used which further reduces cost and the footprint of the dewatering system.

In embodiments in which the dwell time of air passing through the separation vessel is relatively small (e.g., less than about 5 seconds, 3 seconds or even 1 second or less), the solid material contacts liquid for a relatively small amount of time which reduces absorption of liquid by the solid particles which allows the particles to more easily travel over screens in downstream screening operations and allows at least some material to be processed before becoming a slurry which reduces water usage. Reducing dwell time also allows the size of the separation vessel to be reduced which reduces size and weight of the apparatus. In embodiments in which the airlock discharges directly to the dewatering screens of the dewatering system without intermediate processing (e.g., without centrifugation), the amount of time the solid earthen material contacts liquid may be further reduced which improves separation of solids from the liquid.

In embodiments in which the airlock has an outlet that tapers outwardly from a vertex, air may be pulled into the airlock near the vertex at a relatively high velocity, which causes the cut earthen material and water resting on the vane rotating into the opening to be agitated which promotes material to fall from the vane.

In embodiments in which the airlock includes a relatively small number of vanes (e.g., less than 15 or less than 10) and corresponding pockets, relatively large solids may be processed through the airlock. The number of vanes and the vane length may be selected to allow the pockets to accommodate the largest size of cut earthen material that may fit through the vacuum conduit. In embodiments in which the airlock rotates relatively slowly (e.g., less than 10 RPM), the amount of air that passes into the airlock into the vacuum system may be reduced.

In some embodiments, the vacuum system includes a positive displacement vacuum pump to increase the capacity and the vacuum generated by the system to allow larger solids to be processed (e.g., generating a vacuum of at least 18" Hg at 3000 cubic feet per minute).

In embodiments in which the apparatus includes a fluid storage and supply system with a plurality of vessels in which maiden water and/or first cycle water is cycled through the vessels or includes a valving system to change the vessel from which excavation water is pulled, maiden water may remain separated from first cycle water with a reduced amount of tank space on the apparatus (e.g., a reduced amount of empty tank space after filling with maiden water before excavation has begun).

In embodiments in which the dewatering system includes a pre-screen that separates larger solids before the spoil material contacts a downstream vibratory screen (e.g., a pre-screen with large openings such the ratio of the size of the pre-screen openings to the size of the openings of the vibratory screen is at least about 100:1), the downstream vibratory screen may be protected from impact with the large solids which reduces damage and fouling of the vibratory screen.

In embodiments in which the system includes a pitch and roll adjustment system with a pivot member that is laterally aligned with the outlet of the airlock, rolling of the screen (e.g., pre-screen, vibratory screen, or flat wire belt conveyor) caused by impact of material onto the screen is reduced or eliminated. In embodiments in which the pivot member is positioned rearward to a center plane of the screen (i.e., closer to the rear of the screen), the screen moves less near the airlock when the pitch of the screen is adjusted. This allows for less clearance between the screen and airlock and the vertical profile of the apparatus may be reduced. This also allows the spoil material to travel along a longer length of the screen which promotes separation of water from the spoil material.

By processing spoil material onboard the apparatus, solid materials may be separated to allow the spoil material (e.g., first pass water) to be more efficiently stored on the apparatus due to the smaller volume of the material. Separating solids allows the recovered water to be used for excavation in one or more cycles. Separated solids may be used for backfilling the excavation site which reduces the cost of the excavation operation and allows for efficient use of solids.

In embodiments in which the cyclonic separation system includes conveyors below the cyclones for removing material, the conveyors can remove material from the solids outlet of the cyclones which reduces or prevents pluggage of the cyclone outlets. Use of sealed conveyors and peristaltic pumps prevents air from entering the system from the ambient atmosphere.

In embodiments in which the fluid storage and supply system includes a manifold connected to the vessels of the system and valves that may be actuated to allow the vessels to be filled from the manifold, the first vessel pump may be operated to quickly fill additional tanks with maiden water through the manifold. Use of an airgap device prevents contamination of maiden water through back-flow.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A hydro excavation vacuum apparatus for excavating earthen material comprising:
   a wand for directing pressurized water toward earthen material to cut the earthen material at an excavation site;
   a vacuum pump for removing cut earthen material and water from the excavation site in an airstream, the vacuum pump being a positive displacement pump;
   a separation vessel for removing cut earthen material and water from the airstream;
   a conduit for conveying water and cut earthen material from the excavation site to the separation vessel, the conduit having a diameter $D_1$; and
   an airlock that receives material from the separation vessel and discharges the material through an airlock outlet, the airlock comprising vanes with pockets and pocket sidewalls that contact and rotate with the vanes, the pockets being disposed between adjacent vanes and the pocket sidewalls, the vanes being sized to receive particles with the diameter $D_1$ or greater, the airlock further comprising a housing, the housing having a first sidewall, a second sidewall, and an outer circular wall that extends from the first sidewall to the second sidewall, wherein the airlock outlet extends through the outer circular wall and tapers outwardly from a vertex toward at least one sidewall, and wherein each of the vanes of the airlock comprises a distal end located proximate the outer circular wall.

2. The hydro excavation vacuum apparatus as set forth in claim 1 wherein the outlet tapers from the vertex toward the first sidewall and tapers from the vertex toward the second sidewall.

3. The hydro excavation vacuum apparatus as set forth in claim 2 wherein the outlet tapers from the vertex toward the first sidewall along a straight path and tapers from the vertex toward the second sidewall along a straight path.

4. The hydro excavation vacuum apparatus as set forth in claim 1 wherein the outer circular wall has a center midway between the first and second sidewalls, the vertex being at the center of the outer circular wall.

5. The hydro excavation vacuum apparatus as set forth in claim 1 wherein the airlock has less than 15 vanes.

6. The hydro excavation vacuum apparatus as set forth in claim 1 wherein the wand comprises a rotary nozzle for directing water in a rotating, circular path toward the earthen material at the excavation site.

7. A method for hydro excavating a site with the hydro excavation vacuum apparatus as set forth in claim 1, the method comprising:
   directing pressurized water from the wand toward an excavation site, the pressurized water cutting earthen material;
   removing cut earthen material and water from the excavation site in an airstream and into a separation vessel, the cut earthen material and water separating from the airstream and falling toward an airlock;
   rotating the vanes of the airlock at a speed of less than 10 RPM to move cut earthen material and water from an airlock inlet toward an airlock outlet; and introducing material discharged from the airlock outlet into a dewatering system, the dewatering system separating water from cut earthen material removed from the excavation site.

8. The method as set forth in claim 7 wherein the vanes of the airlock rotate at a speed of less than 5 RPM to move cut earthen material and water from the airlock inlet toward the airlock outlet.

9. The hydro excavation vacuum apparatus as set forth in claim 1 wherein the pockets have a depth of $D_1$ or more.

10. The hydro excavation vacuum apparatus as set forth in claim 1 wherein each pocket has a bottom, top and a mid-point midway between the top and the bottom, the pocket having a width at the mid-point, the width being at least $D_1$.

11. The hydro excavation vacuum apparatus as set forth in claim 1 further comprising a dewatering system having one or more vibratory screens, the airlock discharging into the dewatering system.

12. The hydro excavation vacuum apparatus as set forth in claim 1 wherein each of the vanes comprise a main portion and an outer wear strip, the outer wear strip connected to the main portion, wherein the outer wear strip extends toward the outer circular wall of the housing.

13. A hydro excavation vacuum apparatus for excavating earthen material comprising:
a wand for directing pressurized water toward earthen material to cut the earthen material at an excavation site;
a vacuum pump for removing cut earthen material and water from the excavation site in an airstream, the vacuum pump being a positive displacement pump;
a separation vessel for removing cut earthen material and water from the airstream;
a conduit for conveying water and cut earthen material from the excavation site to the separation vessel, the conduit having a diameter $D_1$; and
an airlock that receives material from the separation vessel and discharges the material through an airlock outlet, the airlock comprising vanes with pockets and pocket sidewalls that contact and rotate with the vanes, the pockets being disposed between adjacent vanes and the pocket sidewalls, the vanes being sized to receive particles equal to or greater than the diameter $D_1$.

14. The hydro excavation vacuum apparatus as set forth in claim 13 wherein the pockets have a depth of $D_1$ or more.

15. The hydro excavation vacuum apparatus as set forth in claim 13 wherein each pocket has a bottom, top and a mid-point midway between the top and the bottom, the pocket having a width at the mid-point, the width being at least $D_1$.

16. The hydro excavation vacuum apparatus as set forth in claim 13 wherein the airlock comprises a housing, the housing having a first sidewall, a second sidewall, and an outer circular wall.

17. The hydro excavation vacuum apparatus as set forth in claim 16 wherein each of the vanes comprise a main portion and an outer wear strip, the outer wear strip connected to the main portion, wherein the outer wear strip extends toward the outer circular wall of the housing.

18. The hydro excavation vacuum apparatus as set forth in claim 16, wherein the outlet tapers from a vertex toward the firt sidewall and tapers from the vertex toward the second sidewall.

* * * * *